(12) United States Patent
Steadman Booker et al.

(10) Patent No.: US 11,099,279 B2
(45) Date of Patent: Aug. 24, 2021

(54) PROCESSING OF A CORRECTED X-RAY DETECTOR SIGNAL

(71) Applicant: KONINKLIJKE PHILIPS N.V., Eindhoven (NL)

(72) Inventors: Roger Steadman Booker, Aachen (DE); Christoph Herrmann, Aachen (DE); Amir Livne, Zichron Ya'aqov (IL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 282 days.

(21) Appl. No.: 15/756,620

(22) PCT Filed: Sep. 15, 2016

(86) PCT No.: PCT/EP2016/071909
§ 371 (c)(1),
(2) Date: Mar. 1, 2018

(87) PCT Pub. No.: WO2017/046289
PCT Pub. Date: Mar. 23, 2017

(65) Prior Publication Data
US 2019/0170880 A1    Jun. 6, 2019

(30) Foreign Application Priority Data
Sep. 18, 2015   (EP) .................................... 15185861

(51) Int. Cl.
*G01T 1/17*     (2006.01)
*G01T 1/24*     (2006.01)

(52) U.S. Cl.
CPC ................ *G01T 1/17* (2013.01); *G01T 1/247* (2013.01)

(58) Field of Classification Search
CPC ....... G01T 1/17; G01T 1/247; G01T 1/14658; G01T 1/14676; G01T 1/14609; G06T 2207/10116
See application file for complete search history.

(56) References Cited

U.S. PATENT DOCUMENTS

| 5,646,408 A | 7/1997 | Goldberg |
| 6,822,506 B2 | 11/2004 | Binkley |

(Continued)

FOREIGN PATENT DOCUMENTS

| WO | 2005/121988 | 12/2005 |
| WO | 2010/109353 | 9/2010 |

(Continued)

OTHER PUBLICATIONS

Steadman, et al., "ChromAIX: A high-rate energy-resolving photon-counting ASIC for Spectral Computed Tomography"; Nuclear Instruments and Methods in Physics Research Section A: Accelerators, Spectrometers, Detectors and Associated Equipment, vol. 648, Suppl. 1 (2011).

*Primary Examiner* — Alexander Satanovsky
*Assistant Examiner* — Lynda Dinh
(74) *Attorney, Agent, or Firm* — Larry Liberchuk

(57) ABSTRACT

A detector signal is corrected by superimposing the detector signal with a correction signal. For providing a valid correction signal, a sampling pulse is periodically or randomly provided. The sampling pulse serves as the initiator for sampling a process signal. During the sampling, the process signal is observed. In case a pulse at the process signal is detected, the sampling is assumed as not being suitable to correct the detector signal, since the pulse affects the process signal. Otherwise, the process signal is further observed during a validation period to validate whether the sampled process value of the process signal has already been influenced by an upcoming pulse at the process signal. In case the (Continued)

sampling is assumed as valid, the sampled process value is used as a basis for providing the correction signal.

10 Claims, 16 Drawing Sheets

(56) References Cited

U.S. PATENT DOCUMENTS

| | | | | |
|---|---|---|---|---|
| 6,903,344 | B2 | 6/2005 | Breeding | |
| 7,139,362 | B2 * | 11/2006 | Heismann | A61B 6/032 |
| | | | | 378/5 |
| 7,807,973 | B2 * | 10/2010 | Mott | G01T 1/17 |
| | | | | 250/362 |
| 10,466,372 | B2 * | 11/2019 | Kang | G01T 1/2006 |
| 2006/0015290 | A1 * | 1/2006 | Warburton | G01T 1/17 |
| | | | | 702/178 |
| 2010/0329425 | A1 | 12/2010 | Guo | |
| 2012/0138808 | A1 * | 6/2012 | Jung | H04N 5/378 |
| | | | | 250/370.09 |
| 2013/0284940 | A1 * | 10/2013 | Herrmann | G01T 1/17 |
| | | | | 250/393 |
| 2014/0091228 | A1 * | 4/2014 | Yamakawa | G01T 1/24 |
| | | | | 250/370.09 |
| 2015/0083913 | A1 * | 3/2015 | Kinugasa | G01T 1/171 |
| | | | | 250/336.1 |
| 2015/0250444 | A1 * | 9/2015 | Tamura | A61B 6/585 |
| | | | | 378/19 |

FOREIGN PATENT DOCUMENTS

| | | | |
|---|---|---|---|
| WO | WO 2014/057400 | * | 4/2014 |
| WO | 2014087264 | | 6/2014 |
| WO | 2015078753 | | 6/2015 |

\* cited by examiner

PROCESSING OF A CORRECTED X-RAY DETECTOR SIGNAL

CROSS REFERENCE TO RELATED APPLICATIONS

This application is the U.S. National Phase application under 35 U.S.C. § 371 of International Application No. PCT/EP2016/071909, filed Sep. 15, 2016, published as WO 2017/046289 on Mar. 23, 2017, which claims the benefit of European Patent Application Number 15185861.0 filed Sep. 18, 2015. These applications are hereby incorporated by reference herein.

FIELD OF THE INVENTION

The invention relates to an apparatus for processing a corrected X-ray detector signal as well as to a corresponding method. The invention further relates to an imaging system comprising the apparatus, a computer program element for controlling the apparatus or the system as well as a computer-readable medium having stored the program element.

BACKGROUND OF THE INVENTION

US 2013/0284940 A1 relates to a detection device for detecting photons emitted by a radiation source as well as a corresponding detection method. A signal generation unit generates a detection signal indicative of the energy of a detected photon while photons strike the detection device, and a baseline signal, which is affected by photons that previously struck the detection device, thus even when photons are not striking at the detection device. A baseline shift determination unit determines a baseline shift of the detection signal depending on the baseline signal. The detection device is adapted to be synchronizable with the irradiation of the radiation source such that a baseline shift radiation unit determines the baseline shift during a baseline shift determination time interval during which the radiation source is prevented from irradiating the detection device. The synchronizability of the detection device is realized by a suitable interface, such that a suitable synchronization signal can be provided from the radiation source to the detection device.

SUMMARY OF THE INVENTION

There may be a need to provide an improved correction of an X-ray detector signal without making use of a synchronization signal provided by an X-ray radiation source. Thus, there may be the need to provide a correction of the X-ray detector signal independently of a prior knowledge about the behavior of an X-ray radiation provided by the X-ray radiation source.

The object of the present invention is solved by the subject-matter of the independent claims, wherein further embodiments are incorporated in the dependent claims. It should be noted that the following described aspects of the invention apply also for the apparatus, the method, the system, the computer program element and the computer-readable medium.

According to a first aspect of the invention, an apparatus for processing a corrected X-ray detector signal is provided, comprising an input interface, a signal processing unit and a signal correction unit. The input interface is configured to receive a detection signal representing X-ray radiation detected by an X-ray detector. The apparatus is configured to determine a basis signal on the basis of a difference between the detection signal and a correction signal. The apparatus is further configured to periodically and/or randomly provide a sampling pulse. The signal processing unit is configured to provide a process signal on the basis of the basis signal. The signal correction unit is configured to sample a first process value of the process signal at a first sampling period subsequent to the sampling pulse. The signal correction unit is further configured to observe the process signal during the first sampling period and a validation period subsequent to the first sampling period. The signal correction unit is further configured to detect a first process signal pulse at the process signal, in case the first process signal pulse occurs during the first sampling period and/or the first validation period. The signal correction unit is further configured to provide the correction signal on the basis of the first process value subsequent to the first validation period, if the first process signal pulse has not been detected.

In an example, an X-ray radiation flux, in particular a continuous X-ray radiation flux, may be provided to the X-ray detector. Upon detecting X-ray radiation, the detector may be configured to provide the detection signal. Whenever an X-ray photon may be detected by the X-ray detector, the detection signal value may increase or decrease in form of a pulse. Consequently, a pulse form of the detector signal may be called as a detector signal pulse.

In an example, the X-ray detector may relate to a CdTe-X-ray detector, CdZnTe-X-ray detector, GaAs-X-ray detector and/or a Si-X-ray detector. Other embodiments of an X-ray detector may also be suitable.

In an example, the detector signal may be corrected by the correction signal in order to form the basis signal.

The processing unit may be configured to process the basis signal in order to provide the process signal.

In an example, the processing unit may comprise a charge sensitive amplifier (CSA) and/or a shaper. The output of the charge sensitive amplifier may form the input of the shaper. Thus, they may be arranged in series.

The charge sensitive amplifier may be configured to generate a step response signal, in case a detector signal pulse is processed.

The shaper may be configured as a series circuit of a high pass filter and a low-pass filter, or vice versa. The shaper may be configured to provide a pulse in response to a step response signal of the charge sensitive amplifier.

The output of this shaper may form the output of the signal processing unit.

The signal course of the process signal may comprise several pulses, which may be called process signal pulses. The time between two following signal pulses may be defined as an off-period. The off-period my follow a random process, in particular a poisson random process. During this off-period, no pulse occurs at the process signal.

The apparatus, in particular its signal correction unit, may be configured to periodically or randomly provide a sampling pulse. As a result, a forced sampling may be provided, in particular independent of a knowledge of a flux and/or an emitting time of X-ray photon from an X-ray source.

Each sampling pulse may form the starting point for the first sampling period. During the sampling period, the signal correction unit may be configured to sample the first process value. Accordingly, the signal correction unit may be configured to observe the process signal. The signal correction unit may further observe the process signal after the first sampling period, namely during the first validation period. In case no signal pulse occurs at the process signal during the first sampling period and the first validation period, the signal correction unit may be configured to provide a correction signal on the basis of the sampled, first process value.

As a result, the first process value may be sampled during an off-period the process signal, since no pulse is detected at the process signal during the sampling and thereafter. Consequently, the sampled first process value may be valid for correcting the detector signal. Accordingly, the signal correction unit may be configured to provide the correction signal on the basis of the first process value. The correction signal and the detector signal may be subtracted or added, in order to determine the basis signal. The basis signal may be regarded as the corrected detector signal. The basis signal is provided to the processing unit for further processing.

In case a pulse at the process signal occurs during the first sampling period and/or the first validation period, the signal correction unit may not provide the correction signal and/or may not change the previous provided correction signal.

As an effect, the correction signal may not be "updated" in case a process signal pulse occurs during the first sampling period or the first validation period. Thus, the correction signal may be "updated"- and in particular just then updated—in case the sampling period and the validation period are "free" of a process signal pulse.

As a further result, the correction signal may be updated—at least at a best case scenario—with every sampling pulse.

As a further result, the periodically or randomly provided sampling pulse may force re-initiations of the observation of the process signal and preferably updating the correction signal, even if a subsequent cycle of observing the process signal and detecting of a first process signal pulse may have prevented an update of the correction signal. In an example, providing the correction signal may also relate to as updating the correction signal.

As a further result, the detector signal may be corrected on the basis of the information provided with the detector signal as such. In particular, further synchronization information about the providence of an X-ray radiation of an X-ray source may not be needed.

According to an exemplary embodiment of the present invention, for detecting the first process signal pulse, the signal correction unit may be further configured to compare the value of the process signal with an upper threshold value and/or a lower threshold value, wherein the upper threshold value is larger than a baseline value and the lower threshold value is smaller than the baseline value, and to determine an occurrence of the first process signal pulse, if the value of the process signal exceeds the upper threshold value or the lower threshold value.

In an example, the baseline value may relate to a value of the process signal in absence of X-ray impinging at the X-ray detector and/or any leakage from the X-ray detector. As a result, the threshold comparison may be used to detect a pulse at the process signal. An analogous configuration may be used to detect a second or further process signal pulse at the process signal.

According to a further exemplary embodiment, the signal correction unit may be configured to interrupt, subsequently after the detection of the first process signal pulse, the observation of the process signal during the first sampling period and/or the first validation period and/or to interrupt, subsequently after the detection of the first process signal pulse, the detection of the first process signal pulse.

As a result, the sampling of the process signal, the observation of the process signal and/or the resulting providence of a correction signal may be aborted, in case a first process signal pulse destroys a validity of the sampled first process value. Otherwise, a sampling pulse could initiate a sampling of the process signal, which may be dominated by a process signal pulse and thus being invalid and/or improper for correcting the detector signal. By aborting the sampling, the observation and/or the providence of the correction signal, a faulty update of the correction signal may be prevented.

According to a further exemplary embodiment of the present invention, the signal correction unit may further be configured to detect, if the first process signal pulse has been detected, an end time of the first process signal pulse, to sample a second process value of the process signal at the second sampling period subsequent to the end time of the first process signal, to observe the process signal during the second sampling period and a second validation period subsequent to the second sampling period, to detect a second process signal pulse at the process signal, in case the second process signal pulse occurs during the second sampling period and/or the second validation period, and to provide a correction signal on the basis of the second process value subsequent to the second validation period, if the second process signal pulse has not been detected.

As a result, the signal correction unit may be configured to re-initiate the steps to provide a correction signal, in case the first process signal pulse has been detected. The re-initiation may start after the first pulse of the process value has ended. Thereafter, a sampling of the process signal may take place and the subsequent period may be observed in order to validate the sampled process signal. In case no further process pulse occurs during this observation, the signal correction unit may be configured to provide, thus to (anew) set or to update the correction signal on the basis of the second process value. Otherwise, in case a second process signal pulse may occur even during the second sampling period and/or the second validation period, the providence of the correction signal on the basis of the second process value may be aborted and/or interrupted.

According to a further exemplary embodiment, the signal correction unit is further configured to determine a provided signal pulse as a forced signal pulse, if a first process signal pulse has been detected during the previous first sampling period and/or during the previous first validation period and/or if a second process signal pulse has been detected during the previous second sampling period and/or during the previous second validation period, to sample a third process value of the process signal at a third sampling period subsequent to the forced sampling pulse, and to provide the correction signal on the basis of the third process value subsequent to the third sampling period.

As a result, a sampling pulse may be set as the forced sampling pulse, if the previously sampled first process value has been evaluated invalid and/or if the previously sampled second process value has been evaluated invalid.

As a further result, the forced sampling pulse may initiate a forced sampling of the process value to provide the third process value. An observation of the process value for validation purpose subsequent to the occurrence of the forced sampling pulse is preferably omitted. Consequently, the forced sampling pulse may initiate a forced sampling of the process signal and a forced providence, in particular a forced update and/or a forced anew set, of the correction signal.

As a further result, the forced sampling pulse may force to correct the correction signal, even if a validation of the sampled value of process signal is neglected.

As a further result, a mean value of the correction signal may be forced to a value range of the process signal between the upper threshold value and/or the lower threshold value. Thereafter, a further sampling pulses may be provided due to its periodically or randomly providence, which may initiate a sampling of the process signal and an observation during the respective subsequent periods for validation purposes.

According to a further exemplary embodiment of the present invention, the signal correction unit may be further configured to determine a first auxiliary signal by high-pass-filtering of the process signal, to determine a second auxiliary signal by comparing the first auxiliary signal with a first auxiliary threshold value, wherein the value of the second auxiliary is a high second value, if the value of the first auxiliary value exceeds the first auxiliary threshold value, and a low second value otherwise, wherein the high second value is larger than the low second value, to determine a third auxiliary signal by low-pass-filtering the second auxiliary signal, to determine a fourth auxiliary signal by comparing the third auxiliary signal with a second auxiliary threshold value, wherein the value of the fourth auxiliary signal is a high fourth value, if the third auxiliary value exceeds the second auxiliary threshold value, and a low fourth value otherwise, wherein the high fourth value is larger than the low fourth value, and to interrupt an update of the correction signal and/or the determination of the forced signal pulse, while the value of the fourth signal is equal to the high fourth value.

As a result, the third auxiliary signal may represent a value proportional to a rate of the pulses at the detector signal and/or the process signal. An off-period between two following pulses may decrease, if the third auxiliary signal value increases. By setting the fourth auxiliary threshold value, a minimum limit for the off-period may be defined, up to which a correction signal may be updated or set by the signal correction unit. Otherwise, the update or the anew set of the correction signal and/or the determination of a signal pulse as a forces signal pulse may be interrupted, namely in case the value of the fourth signal is equal to or higher than the high fourth value, since the off-period between two pulses may be too short for sampling and validating a sampled process value.

According to a further example of the present invention, the previously explained interruption of the update of the correction signal may just be performed, if the update of the correction signal is initiated by a sampling pulse or the end time.

According to a further exemplary embodiment, the signal correction unit may be configured to interrupt, subsequently after the detection of the second process signal pulse, the observation of the process signal during the second sampling period and/or the second validation period and/or to interrupt, subsequently after the detection of the second process signal pulse, the detection of the second process signal pulse.

As a result, the sampling of a second process value, the observation of the process signal, the detection of a second process signal and/or the providence of a correction signal may be aborted on the basis of the second process value, in case the second process signal pulse has been detected.

According to a second aspect of the invention, an X-ray imaging system is provided, comprising: an apparatus according to one example as described above, a detector unit configured to detect X-ray radiation, and an evaluation unit configured to resolve the value of the process signal into different value levels and to provide an evaluation signal on the basis of the resolving results.

In an example, the imaging system may comprise an X-ray source for providing X-ray radiation.

In a further example, the X-ray imaging system may further comprise an object-receiving space arranged between X-ray source and the detector unit. The detector unit may also be called as the X-ray detector.

X-ray radiation provided by the X-ray source may at least in part impinge on the X-ray detector. The corresponding detector signal of the X-ray detector may be used to calculate an X-ray image of an object, which may be provided at the object-receiving space.

According to a third aspect of the present invention, a method for correcting an X-ray detector signal may be provided, comprising the following steps:
a) receiving a detector signal representing X-ray radiation detected by an X-ray detector;
b) determining a basis signal on the basis of a difference between the detector signal and a correction signal;
c) providing a process signal by signal processing the basis signal;
d) periodically or randomly providing a sampling pulse;
e) sampling a first process value of the process signal at a first sampling period subsequent to the sampling pulse;
f) observing the process signal during the first sampling period and a first validation period subsequent to the first sampling period, wherein step f) comprises the sub-step f1) of detecting a first process signal pulse at the process signal, in case the first process signal pulse occurs during the first sampling period and/or the first validation period; and
g) providing the correction signal on the basis of the first process value subsequent to the first validation period, if the first process signal pulse has not been detected.

With respect to the order of the method steps, it is to be noted that step d) is performed before step e), step e) is performed before step f) and step f) is performed before step g). Further, steps a), b) and c) may be performed continuously and/or in parallel. In particular, the X-ray detector may provide a continuous detection signal, which may be continuously received. The process signal may also be provided continuously. Further, the determination of the basis signal may be determined continuously on the basis of a difference between the detector signal and a correction signal.

In an example, the detector signal, the basis signal and/or the process signal may be analogous signals and/or digital signals. The correction signal may be an analogous signal or a digital signal.

According to a fourth aspect of the present invention, a computer program element for controlling the apparatus according to one of the preceding examples and/or the system is provided, which, when being executed by a processing unit, is adapted to perform the method according to the preceding example.

According to a fifth aspect of the present invention, a computer-readable medium having stored the computer element may be provided.

According to an aspect of the invention, an apparatus and a method for correcting an X-ray detector signal is provided. An X-ray detector is configured to detect X-ray radiation, which was formerly emitted from an X-ray source. Between the X-ray source and the X-ray detector, an object-receiving space is arranged. In case an object of interest is arranged at the object-receiving space, the X-ray radiation impinging the detector was at least partly previously influenced by the object of interest. Correspondingly, the detector may provide a detection signal based on the detected X-ray radiation, which indicates the object of interest.

Although the X-ray radiation is usually provided continuously by the X-ray source, the X-ray detector may be configured to provide for each detected X-ray quanta and/or X-ray photon a pulse at the detector signal. Consequently, pulses may be provided at a signal course of the detection signal. Further, X-ray detectors may suffer from a non-ideal behavior, in particular from non-ideal artifacts, which may be present of persistent currents, which may be due to photoconductive gain. Such artifacts may result in spectral shifts and/or in parallel the energy scale shifts due to a presence of additional low-frequency current components. Further, the X-ray detector may exhibit a non-negligible dark current. This dark current may depend on a temperature of the X-ray detector. Throughout a use of the X-ray detector, the temperature may drift and thus may cause an energy scale shift. To deal with these effects, the detector signal may be corrected by a correction signal.

In order to provide a valid value for the correction signal, it is suggested to observe the process signal, which is provided by processing the basis signal. The basis signal can be calculated by a superposition of the detector signal and a previously provided correction signal. In an example, both detector and corrections signals are current signals which are subtracted or added from each other depending on their corresponding sign, preferably corresponding to its current flow direction.

Even though X-ray photons may impinge on the X-ray detector unperiodically or at random time, poisson process statistics shows that two time adjacent pulses at the detector signal are often spaced apart by an off-period. Such distribution and characteristics of such off-period depends on the average photon rate of the poisson process, i.e. X-ray flux. During this off-period, the value of the detector signal is ideally supposed to be at a baseline-value. This baseline-value could be 0 or another suitable value. In case the value of the detector signal is different from the baseline-value, a difference between the baseline-value and the actual value of the detector signal may be used to determine a correction signal, which in turn is superposed with the detector signal in order to change the level of the detector signal to the baseline level. Thus, in case a pulse at the detector signal occurs subsequently after correcting the baseline level, the detector signal may be suitability processed by the process unit to provide a valid process signal for a further purpose. A difference between the ideal baseline position and the actual detector signal in absence of x-ray pulses may be cause by leakage currents or other low frequency phenomena.

For providing a valid correction signal, a sampling pulse is periodically or randomly provided. This sampling pulse serves as the initiator for sampling the process signal. During the sampling of the process signal, the process signal is observed. In case a pulse at the value of the process signal is detected, the sampling is assumed as not being suitable to correct the detector signal, since the pulse affects the process signal, i.e. the signal interferes with the purpose of sampling the baseline position. Otherwise, namely in case such a process signal pulse does not occur during the sampling period, the process signal is further observed during a validation period, which is subsequently arranged to the sampling period. This validation period is used to validate, whether the sampled process value of the process signal has already been influenced by an upcoming pulse at the process signal. Therefore, in case a pulse is detected at the process signal during the validation period, the previously performed sampling is assumed as invalid. Therefore, the sampled process value is assumed as not being suitable for providing a basis for determining a correction signal. Consequently, the correction signal is not determined, in particular (anew) set and/or updated, in case a process signal pulse is detected during the sampling period or the validation period. Otherwise, the sampling is assumed as valid and the sampled, process value is used as a basis for providing, in particular setting or updating, the correction signal. An updated or anew set correction signal in turn changes the baseline of the corrected detector signal, namely the so called basis signal as the input for the process unit. Consequently, the basis signal is adjusted and therefore free of the influence, which causes a shift of the baseline. As an effect of the invention, the baseline may be corrected independent of the direct knowledge of the timing, at which the X-ray source provides X-ray radiation to the object-receiving space and/or at least a part thereof to the X-ray detector. Therefore, the invention may be applied to any X-ray imaging system, independently of the knowledge, when X-ray quanta and/or X-ray photons impinge on the X-ray detector.

The sampling process is therefore dependent on whether a pulse is detected in the interval in which taking a sample is foreseen. The advent of a process pulse in that interval effectively renders the sample invalid. The sampling is thereby subsequently iterated until an adequate off-time is observed. The detection of a pulse may be implemented by one or more signal threshold close to the predefined ideal baseline position.

A provision is also made in the case no sample is validated within two consecutive sampling pulses. In that event, just before the subsequent sampling pulse, a sample is taken regardless on whether a validation interval has been overserved, i.e. forced sampling. It must be noted that at low X-ray fluxes the need for such a provision is highly improbable and its implementation is therefore depending on the operation conditions of the system. It serves however an important role on making sure that the sampling mechanism is maintained in an adequate operating range. In the event of the baseline having shifted beyond the aforementioned signal threshold(s), it may occur that the signal threshold(s) indicate the presence of the pulse even if this may not be the case. A situation in which such an undesirable shift may occur is when the detector has been exposed to very high photon rates. The probability if observing a sufficiently long off-time is very low. The aforementioned force-sampling must therefore be by all means disabled by a mechanism of detecting, if the photon rates is above a certain predefined level. This in turn may mean that no sample is taken over a prolonged time. A shift in the detector leakage or other phenomena in that time may cause the baseline to also shift beyond the signal threshold(s). Upon returning to a low flux condition, the shift may have been such that no sampling process is possible. In this case the provision of force sampling ensures that the baseline is restored within the range delimited by the signal threshold(s). Is must be noted that although the probability of taking an invalid sample is low, it can still statistically occur. It may therefore be necessary to perform force sampling in several iterations until the baseline is found to be in the desirable range.

BRIEF DESCRIPTION OF THE DRAWINGS

Exemplary embodiments of the invention will be described in the following with reference to the following drawings.

DETAILED DESCRIPTION OF EMBODIMENTS

Figure 1:
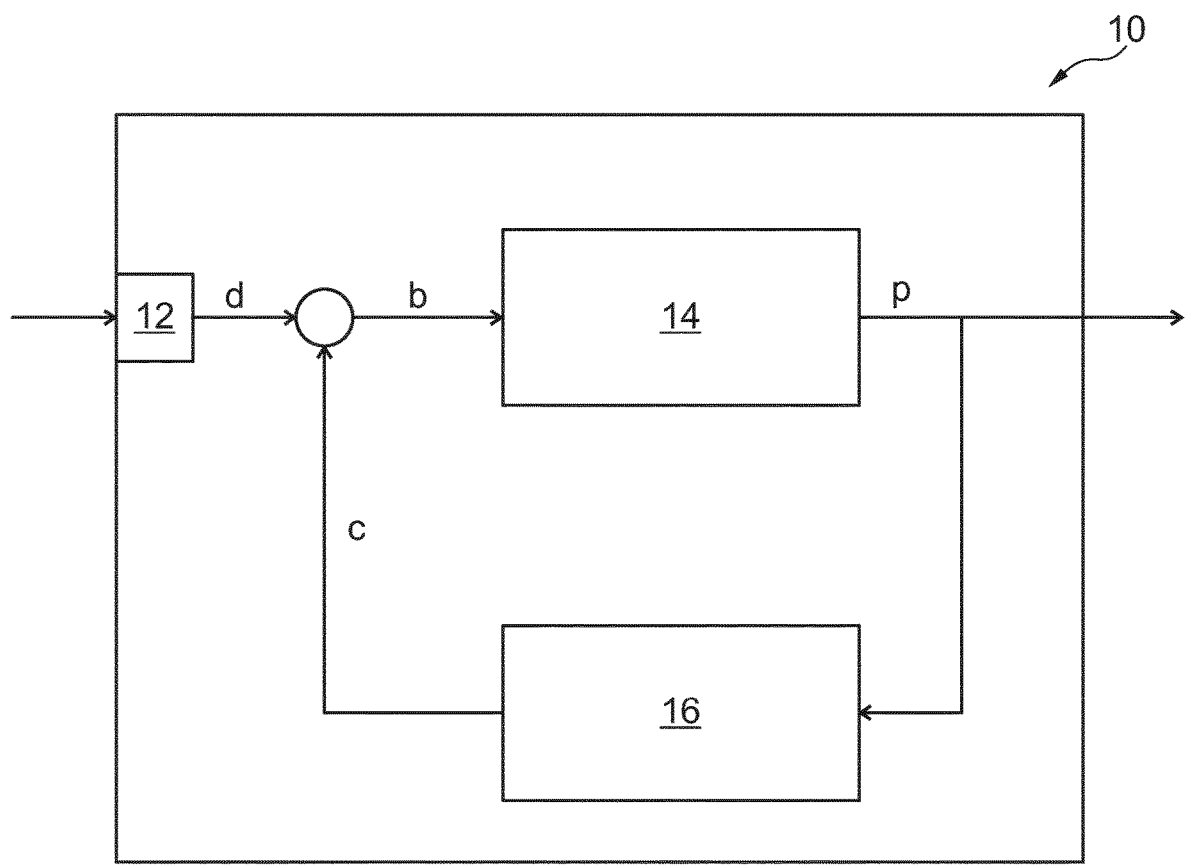
FIG. 1 schematically illustrates an apparatus according to an exemplary embodiment of the invention.

FIG. 1 schematically illustrates an apparatus 10 for processing a corrected X-ray detector signal. The apparatus 10 comprises an input interface 12, a signal processing unit 14 and a signal correction unit 16. The input interface 12 is configured to receive a detector signal d representing X-ray radiation detected by an X-ray detector 42. The apparatus 10 is configured to determine a basis signal b on the basis of a difference between the detector signal d and a correction signal c.

Figure 2:
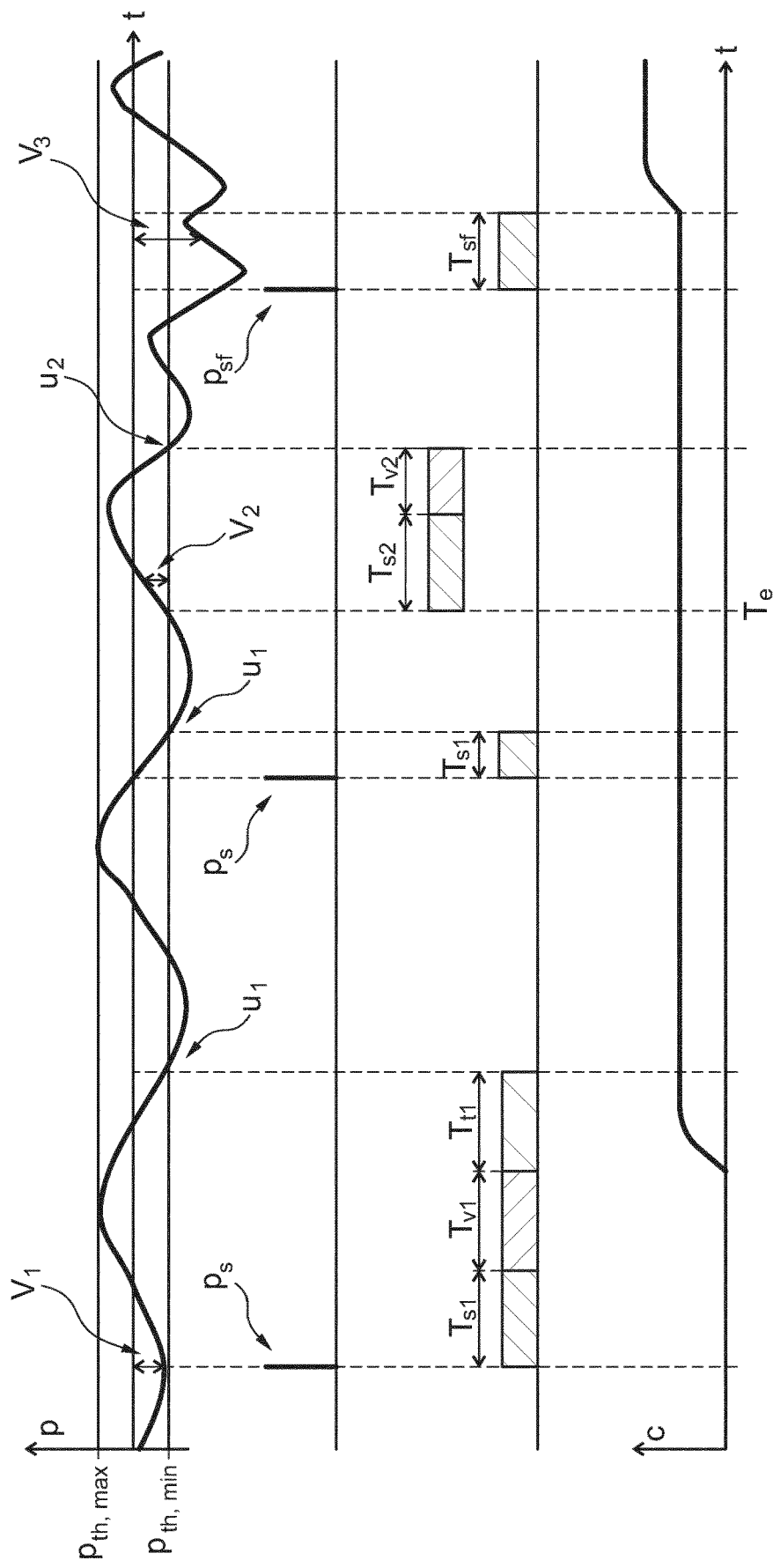
FIG. 2 schematically illustrates a plurality of signal diagrams.

Further details of the apparatus 10 may be become intuitively clear in view of FIG. 2, schematically illustrating an exemplary signal diagram.

The apparatus 10 is further configured to periodically or randomly provide a sampling pulse $P_s$.

The signal processing unit 14 is configured to provide a process signal p on the basis of the basis signal b.

The signal correction unit 16 is configured to sample a first process value $V_1$ of the process signal p at a first sampling period $T_{s1}$ subsequent to the sampling pulse $P_s$. The signal correction unit 16 is further configured to observe the process signal p during the first sampling period $T_{s1}$ and a first validation period $T_{v1}$ subsequent to the first sampling period $T_{s1}$. The signal correction unit 16 is further configured to detect a first process signal pulse $U_1$ at the process signal p, in case the first process signal pulse $U_1$ occurs during the first sampling period $T_{s1}$ and/or the first validation period $T_{v1}$. The signal correction unit 16 is further configured to provide a correction signal c on the basis of the first process value $V_1$ subsequent to the validation period $T_{v1}$, if the first process signal pulse $U_1$ has not been detected.

Figure 4:
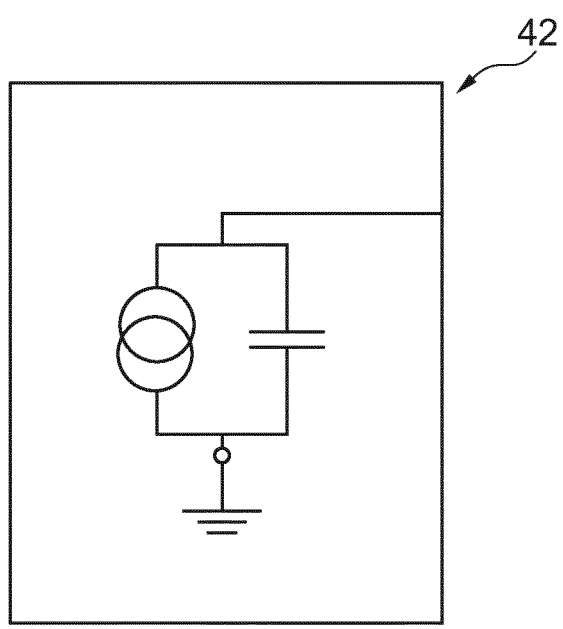
FIG. 4 schematically illustrates an exemplary embodiment of the detector unit.

With respect to FIG. 1, the input interface 12 of the apparatus 10 may be configured to receive the detector signal d. An X-ray detector 42, which is exemplary illustrated in FIG. 4, may be configured to detect X-ray radiation, which has previously been provided by an X-ray source (not shown) and passed an object-receiving space (not shown). Depending on the size and other features of an object of interest, which may be arranged at the object receiving space, more or less X-ray radiation may impinge on the X-ray detector 42. Further, X-ray radiation may be diffracted by the object of interest. Correspondingly, a detector signal d provided by an X-ray detector 42 may represent the information about an image of the object of interest.

As it has been explained in the introduction, X-ray detectors 42 may suffer from drawbacks, which may cause a baseline shift of the value of the process signal c. Therefore, there may be a need for correcting the detector signal 42, which may thereafter be provided to the processing unit. In an example, the corrected detector signal may form the basis signal b.

X-rays emitted by an X-ray source may impinge on the X-ray detector 42 as X-ray quanta and/or X-ray photons. Correspondingly, the value of the detector signal d may comprise pulses, which relate to a detected X-ray quanta and/or to X-ray photons.

As can be seen in FIG. 1, the basis signal b may be calculated on the basis of the detector signal d and the correction signal c. In particular, the basis signal b relates to a superposition of the detector signal d and the correction signal c. In a further example, the correction signal c may be subtracted or added to the detector signal d in order to form the basis signal b. In an example, the basis signal b may also be referred to as the "corrected detector signal".

Figure 3:
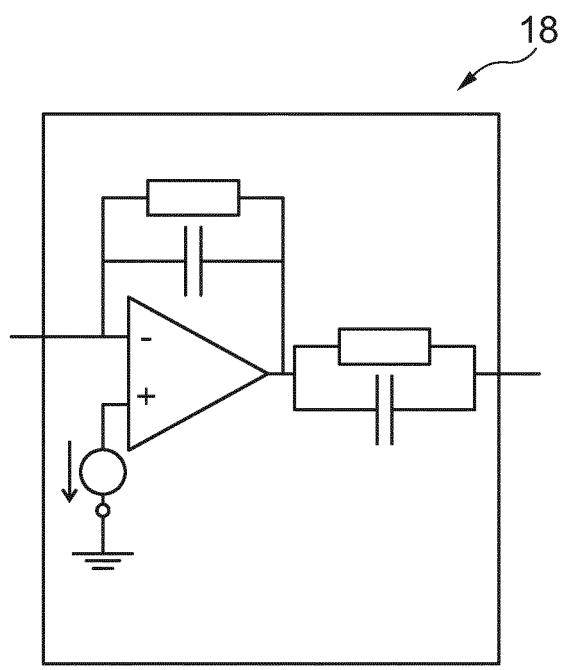
FIG. 3 schematically illustrates an exemplary embodiment of the charge sensitive amplifier.

The basis signal b is provided to the processing unit 14. The processing unit 14 is configured to provide a process signal p on the basis of the basis signal b. In particular, the basis signal b is processed by the processing unit 14 in order to provide the process signal p. In an example, the processing unit 14 comprises a charge sensitive amplifier (CSA) 18 and a shaper 20. An example of the charge sensitive amplifier is shown in FIG. 3. In an example, the charge sensitive amplifier comprises an active low-pass filter and a circuit for a pole-zero cancellation.

The charge sensitive amplifier 18 and the shaper 20 of the signal processing unit 14 may be configured in series, wherein the output of the charge sensitive amplifier 18 may be connected to the input of the shaper 20. Further, the input of the signal processing unit 14 may be formed by an input of the charge sensitive amplifier 18. The output of the signal processing unit 14 may be formed by the output of the shaper 20.

Figure 5:
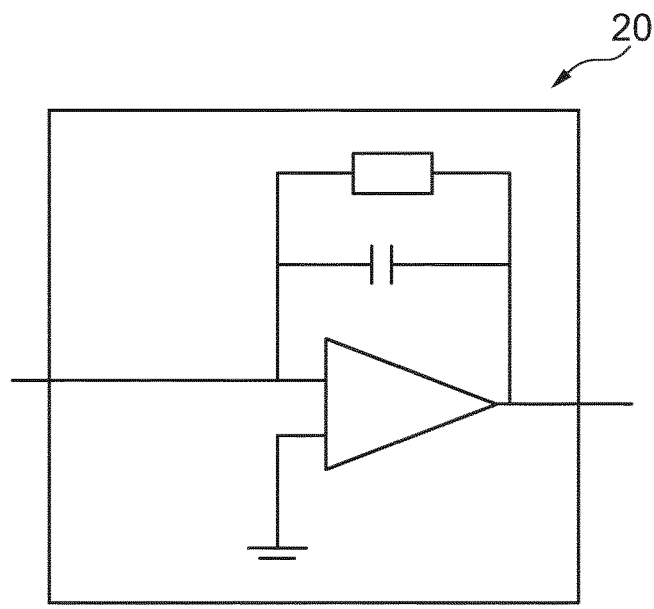
FIG. 5 schematically illustrates an exemplary embodiment of the shaper.

An example of the shaper 20 is schematically shown in FIG. 5. The shaper 20 may comprise a low-pass filter. The low-pass filter may be configured as an active low-pass filter.

In case the response signal provided by the charge sensitive amplifier 18 is provided to the shaper 20, the output signal of the shaper 20 may have a pulse characteristic.

In an example, the shape is configured to provide a value at its output that is proportional to a charge of a detected X-ray photon.

Figure 6:
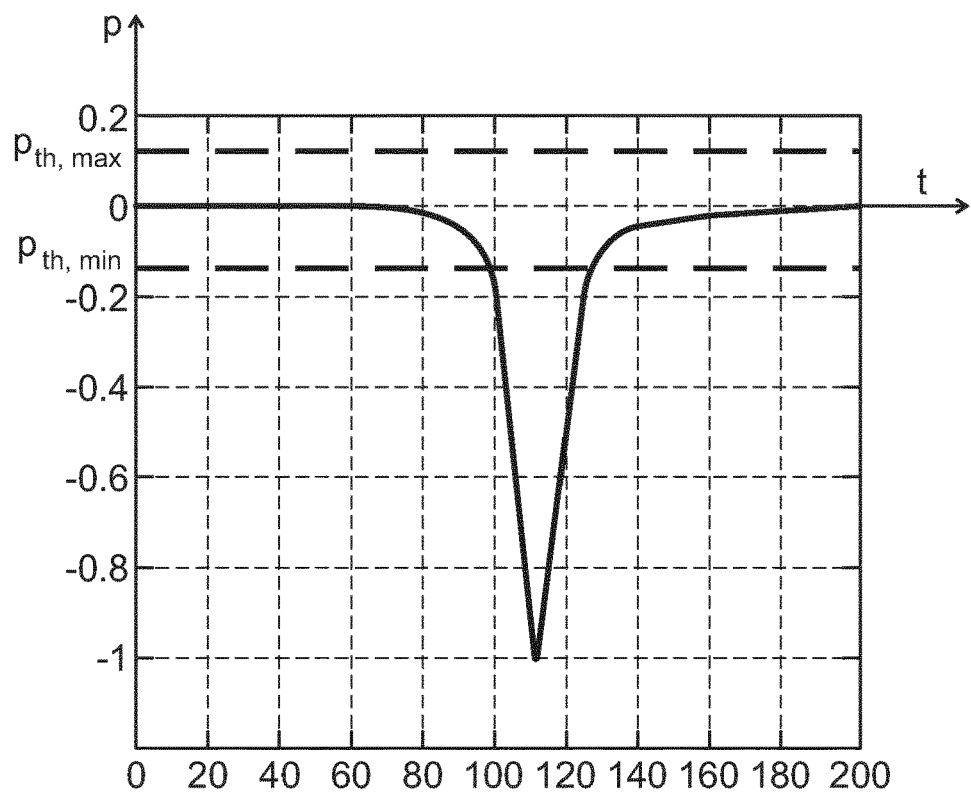
FIG. 6 schematically illustrates an exemplary signal diagram of the shaper.

In an example—as exemplarily mentioned above—the output of the shaper 20 forms the output of the processing unit 14. Accordingly, FIG. 6 may also show a pulse of the process signal p.

In order to detect a pulse at the process signal p, a lower threshold value $p_{th,mean}$ and an upper threshold value $p_{th,max}$ may be provided. In case the process signal p exceeds either one of the threshold values, a digital or analogue pulse may be provided indicative of the detection of a process pulse.

In an example, the apparatus 10 is not configured to receive a synchronization signal, which otherwise would allow determining a timing of an X-ray flux of the X-ray source and/or the timing, when X-ray photons may impinge on the X-ray detector 42. Therefore, the apparatus 10 is configured to periodically or randomly provide a sampling pulse $P_s$.

In an example, the current pulses representing the sampling pulses $P_s$ are schematically shown in FIG. 2.

In an example, the signal correction unit 16 is configured to initiate a sampling of the process signal p and an observation of the process signal p in return to a current pulse representing the sampling pulse $P_s$.

The signal correction unit 16 may therefore be configured to sample the first process value $V_1$ of the process signal p at a first sampling period $T_{s1}$ directly subsequent to the sampling pulse $P_s$.

Figure 7:
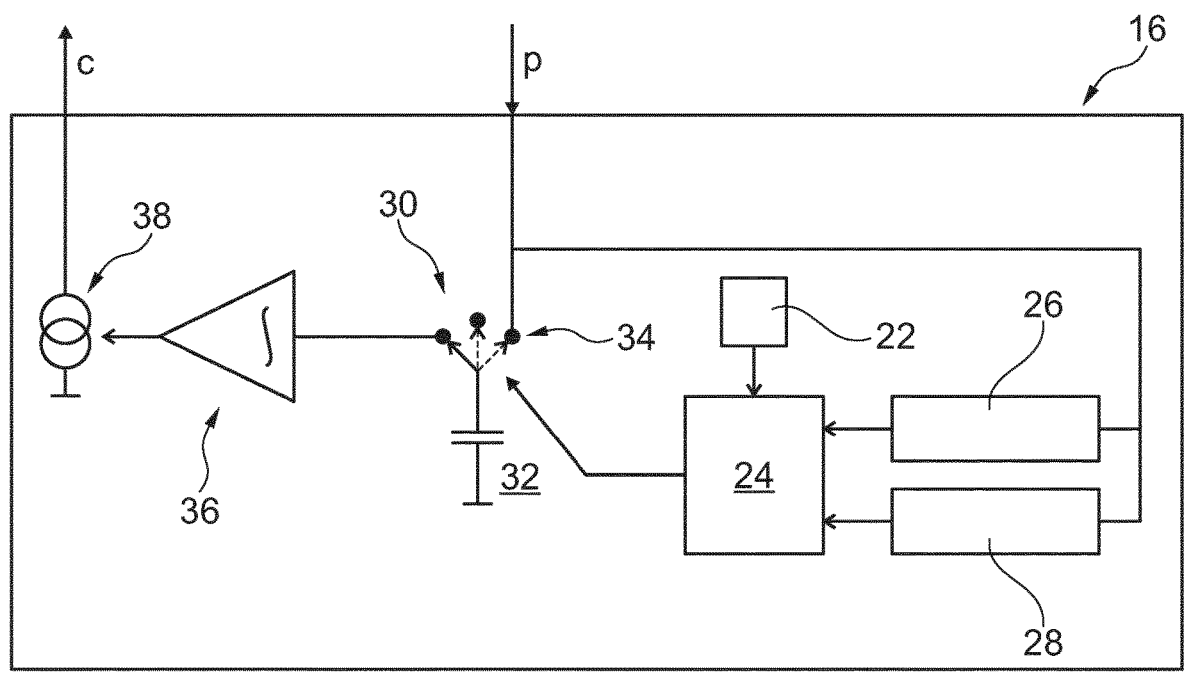
FIG. 7 schematically illustrates an exemplary embodiment of the signal correction unit.

FIG. 7 schematically shows an exemplary embodiment of the signal correction unit 16. The process signal p is provided as an input to the signal correction unit 16. The signal correction unit 16 is configured to provide a correction signal c as an output.

In an example, the signal correction unit 16 comprises a pulse generator 22. The pulse generator 22 may be configured to periodically or randomly provide the sampling pulse $P_s$.

In an example, the signal correction unit 16 further comprises a control unit 24. The pulse generator 22 may be connected to the control unit 24, in order to transmit the periodically or randomly provided sampling pulse $P_s$ to the control unit 24.

In an example, the control unit 24 may be configured to control a switch 30. The switch 30 may be a semiconductor switch or a logical switch.

The switch 30 may be configured to connect a capacitor 32 with at least one of at least three terminals. The terminals may be logical terminals and/or semiconductor terminals. One of the terminals 34 is connected to the input of the signal correction unit 16.

In an example, the first sampling period $T_{s1}$ is arranged directly subsequent to the sampling pulse $P_s$. Thus, in case the sampling pulse $P_s$ occurs, the first sampling period $T_{s1}$ starts. During the first sampling period $T_{s1}$, the control unit 24 may control the switch such that the capacitor 32 is connected to the input of the signal correction unit 16. Thus, the capacitor 32 may be charged by the process signal p.

In a further example, the signal correction unit 16 is configured to observe the process signal p. Therefore, the signal correction unit 16 may comprise a pulse detector 26. The pulse detector 26 may be connected to the input of the signal correction unit 16 in order to provide the pulse detector 26 with the process signal p. In an example, the process signal p is observed by the pulse detector 26 and/or the signal correction unit 16 during the first sampling period $T_{s1}$ and a first validation period $T_{v1}$, which is preferably directly subsequent to the first sampling period $T_{s1}$.

In an example, the pulse detector 26 is configured to detect a first process signal pulse $U_1$ at the process signal p. In an example, the pulse detector 26 detects the first process signal pulse $U_1$, in case the first process signal pulse $U_1$ occurs during the first sampling period $T_{s1}$ or the first validation period $T_{v1}$. Otherwise, a detection of the first process signal pulse $U_1$ may not be performed and/or ignored by the control unit 24. Therefore, the observation of the process signal p with respect to the first process signal pulse $U_1$ is focused on the first sampling period $T_{s1}$ and the first validation period $T_{v1}$.

In an example, the control unit 24 is configured to control the switch 30, such that the capacitor 32 is charged with the process signal p during the first sampling period $T_{s1}$.

In an example, the first process value $V_1$ may relate to a mean value of the process signal p during the first sampling period $T_{s1}$. Alternatively, the first process value $V_1$ may relate to a value of the process signal p at a suitable or predefined time at the first sampling period $T_{s1}$.

In a further example, the control unit 24 may be configured to control the switch 30 to connect the capacitor 32 with another terminal, which is preferably a transfer-terminal. This transfer-terminal may not be connected to a further component and/or unit.

In an example, the signal correction unit 16, and in particular its pulse detector 26, are configured to (still) observe the process signal p during the validation period $T_{v1}$.

With respect to FIG. 2, in case during the first sampling period $T_{s1}$ and the first validation period $T_{v1}$, no first process signal pulse $U_1$ occurs, the signal correction unit 16 is configured to provide a correction signal c on the basis of the first process value $V_1$.

In an example, the control unit 24 is configured to control the switch 30, in case the pulse detector 26 has not detected a first process signal pulse $U_1$ during the first sampling period $T_{s1}$ and the first validation period $T_{v1}$, such that the capacitor 32 is connected to the transfer-terminal, which is further connected to an integrator 36. The integrator 36 is preferably configured to control a current source 38, which is further configured to provide the correction signal c.

In an example, the control unit 24 is configured to connect the capacitor 32 to the integrator 36 during a first correction period $T_{t1}$. The first correction period $T_{t1}$ is preferably directly subsequent to the first validation period $T_{v1}$.

In FIG. 2, the correction signal c may increase to a level corresponding to the charge of the capacitor 32.

In an example, providing a correction signal c may relate to initially set a correction signal a value of the correction signal c and/or to initially update a value of the correction signal c.

As a result, the correction signal c may be set or updated—at least at a best case scenario—with every sampling pulse $P_s$. After every sampling pulse $P_s$, a sampling during the first sampling period $T_{s1}$, an observation of the process signal during the first sampling period $T_{s1}$ and the subsequently first validation period $T_{v1}$ may be performed and/or a detection of a first process signal pulse $U_1$ may occur, and/or in case of an absence of such a first process signal pulse, a new and/or updated correction signal may be provided.

As a result, the sampling pulse $P_s$ may initiate a process for generating and/or updating the correction signal c by the signal processing unit 14.

According to an example of the present invention, for the detection of the first process signal pulse U1, the signal correction unit 16 is further configured to compare the value of the process signal p with an upper threshold value $P_{th,max}$ and/or a lower threshold value $P_{th,min}$, wherein the upper threshold value $P_{th,max}$ is larger than a baseline value $P_{base}$ and the lower threshold value $P_{th,min}$ is smaller than the baseline value $P_{base}$. Further, the signal correction unit 16 may be configured to determine an occurrence of the first process signal pulse $U_1$, if the value of the process signal p exceeds the upper threshold value $P_{th,max}$ or the lower threshold value $P_{th,min}$.

In an example, the aforementioned comparison and/or determination may be performed by the pulse detector 26 of the signal correction unit 16.

In an example, the baseline value $P_{base}$ may be predefined.

As a result, the threshold comparison may be used to detect a first process signal pulse $U_1$ at the process signal p.

As a further result, a signal course with a variation of the value of the process signal p not exceeding the upper threshold value $P_{th,max}$ or the lower threshold value $P_{th,min}$ may be considered as not representing a pulse.

In an example, the upper threshold value $P_{th,max}$ may be predefined.

In an example, the lower threshold value $P_{th,min}$ may be predefined.

In an example, the first process signal pulse $U_1$ is determined, if the value of the process signal p is equal or larger than the upper threshold value $P_{th,max}$.

In a further example, the first process signal pulse $U_1$ is determined, if the value of the process signal p is equal or less than the lower threshold value $P_{th,min}$.

In a further example, the pulse detector 26 may comprise a comparator, which may be configured to perform the comparison of the value of the process signal p with the upper threshold value $P_{th,max}$ and/or the lower threshold value $P_{th,min}$.

As a result, the pulse detector 26 may be configured to monitor the activity of the process signal p around the baseline and/or to discriminate whether a pulse occurs or not.

As a further result, the pulse detector 26 may be configured to validate, whether a charge of the capacitor 32 should be transferred to the integrator 36.

In an example, the pulse detector 26 comprises two discriminators.

In an example, a first discriminator of the pulse detector 26 may be set at the same polarity as a valid process signal pulse caused by an impinging X-ray photon at the X-ray detector 42. As a result, the first discriminator may be configured to monitor, if an X-ray photon impinges at the X-ray detector 42.

In an example, the second discriminator of the pulse detector 26 may be set to the opposite polarity, namely with respect to the polarity of the first discriminator. As an effect, the second discriminator may be configured to sense, if any spurious event was present during the first sampling period $T_{s1}$ and/or during the first validation period $T_{v1}$. Such spurious events may be caused by induction pulses from neighbor pixels at the X-ray detector 42 and/or caused by overshoots for the pixel of the X-ray detector 42.

In an example, the output of the two discriminators of the pulse detector 26 may form input signals to an or-element of the pulse detector 26. The output of the or-element of the pulse detector 26 may—as a result—indicate a disturbance and/or a pulse, which may affect the validity of the first process value $V_1$, sampled during the first sampling period $T_{s1}$. As a result, the first process value $V_1$ may be assessed as invalid to correct the detector signal d.

According to a further example, the apparatus 10 and/or the signal correction unit 16 may be configured to provide the sampling pulse $P_s$ with a sampling frequency $f_s$ or $1/T_s$. In an example, the sampling frequency $f_s$ is between 5 kHz and 100 kHz, in particular between 8 kHz and 15 kHz. In a further example, the sampling frequency $f_s$ may be 10 kHz.

According to a further example, the first sampling period $T_{s1}$ may be defined by a dead-time of the signal processing unit 14. For instance, the first sampling period $T_{s1}$ may be defined between 50% of the dead-time of the signal processing unit 14 and 150% of the dead-time of the signal processing unit 14. In an example, the dead-time of the signal processing unit 14 may be the time, characterizing the delay time that a signal needs to be processed by the signal processing unit 14.

In a further example, the first sampling period $T_{s1}$ may correspond to the dead-time of the signal processing unit 14.

In an example, the first validation period $T_{v1}$ is defined in an analogous manner to the first sampling period $T_{s1}$. Accordingly, reference is made to the preceding explanations.

In an example, the first validation period $T_{v1}$ is as long as the first sampling period $T_{s1}$.

In a further example, the first correction period $T_{t1}$ is as long as the first sampling period $T_1$ and/or as long as the first validation period $T_{v1}$.

With respect to FIG. 2, an onset tail of a first process signal pulse $U_1$ may be relatively long, so that the onset tail may have already been present, when the sampling pulse $P_s$ has been provided and the subsequently sampling during the first sampling period $T_{s1}$ has taken place. Yet, it may not have been sufficiently high to trigger one of the discriminators of the pulse detector 26. In order to make sure, that the first process value $V_1$ sampled during the first sampling period $T_{s1}$ is not distorted by a forthcoming pulse, the validation during the first validation period $T_{v1}$, and/or thus a further observation of the process signal p is preferably performed. In case no activity of the discriminators of the pulse detector 26 was detected during the first sampling period $T_{s1}$ and the first validation period $T_{v1}$, the sampled first process value $V_1$ may be assessed as valid. If an activity on one of the discriminators of the pulse detector 26 was however registered, the first process value $V_1$ may be regarded as invalid. Consequently, the first process value $V_1$ may be discarded.

According to a further example of the present invention, the signal correction unit 16 may be configured to interrupt, subsequently after the detection of the first process signal pulse $U_1$, the observation of the process signal p during the first sampling period $T_{s1}$ and the first validation period $T_{v1}$.

According to a further example of the present invention, the signal correction unit 16 may be configured to interrupt, subsequently after the detection of the first process signal pulse $U_1$, the detection of the first process signal pulse $V_1$.

As a result, a first process signal pulse $V_1$ sampled during the first sampling period $T_{s1}$ may be discarded, if one of the interruptions occurs during the first sampling period $T_{s1}$ and/or during the first validation period $T_{v1}$.

As a further result, the observation, and thus in particular the detection of the first process signal pulse $U_1$ at the process signal, may be interrupted during the first sampling period $T_{s1}$ and/or the first validation period $T_{v1}$.

In FIG. 2, an example of a signal diagram, in particular indicating signal courses of the sampling process, is schematically shown. On the left-hand side, a first sampling pulse $P_s$ occurs. During the subsequent periods, namely the first sampling period $T_{s1}$, the first validation period $T_{v1}$ and the first correction period $T_{t1}$, the process signal p does not initiate an interruption. Thus, no process signal pulse and/or spurious events have been occurred. The first process value $V_1$ may be sampled during the first sampling period $T_{s1}$. Since the process signal p does not provide a first process signal pulse $U_1$ during the first sampling period $T_{s1}$ or the subsequent first validation period $T_{v1}$, the sampled first process value $V_1$ may be assumed as valid. Thereafter, namely during the first correction period $T_{r1}$, the correction signal c may be defined, in particular anew set and/or updated.

As can be also seen in FIG. 2, a process signal pulse $U_1$ occurs almost subsequently after the first correction period $T_{r1}$. However, this first process signal pulse $U_1$ is assumed as not influencing the first process value $V_1$ sampled during the first sampling period $T_{s1}$.

As a result of the periodically or randomly provided sampling pulse $P_s$, a situation may be prevented, where the baseline of the basis signal b has been allowed to drift beyond the margins set by the upper threshold value $P_{th,max}$ and/or the lower threshold value $P_{th,min}$.

In the middle-section of the signal diagram shown in FIG. 2, a further sampling pulse $P_s$ is provided. Subsequent to the sampling pulse $P_s$, the process signal p is sampled during the first sampling period $T_{s1}$. However, as shown in FIG. 2, a first process signal pulse $U_1$ may occur during the first sampling period $T_{s1}$. This may cause an interruption of the observation of the process signal p and/or the interruption of the detection of the first process signal pulse $U_1$. Consequently, the observation of the process signal p and/or the correction of the detector signal d may be aborted.

According to a further example, the signal correction unit 16 may be configured to observe a pulse rate of the process signal p and/or of the detector signal d, wherein the signal correction unit 16 is configured to interrupt an update of the correction signal, while the pulse rate is higher than a predefined rate limit.

As an effect, the update of the correction signal may be prevented at high pulse rates. Thus, the former correction signal value may remain.

At a low pulse rates, a probability of a false providence of the correction signal and/or a false update of the correction signal may be low. However, at higher pulse rates, a periodically or randomly provided sampling pulse $P_s$ may force sampling the process signal p at wrong positions, which may eventually incorrectly provide a correction signal c. In an example, the predefined rate limit may be 1 Mcps, 2 Mcps, 5 Mcps, 10 Mcps or 20 Mcps. The term "Mcps" preferably refers to Mega counts per second.

As a result, the periodically or randomly provided sampling pulse $P_s$ may be aborted or disabled, in case the pulse rate exceeds the predefined rate limit.

In FIG. 7, a rate detector 28 is exemplarily shown as a part of the signal correction unit 16. The rate detector 28 may be configured to perform the above explained observation of the pulse rate.

Figure 8:
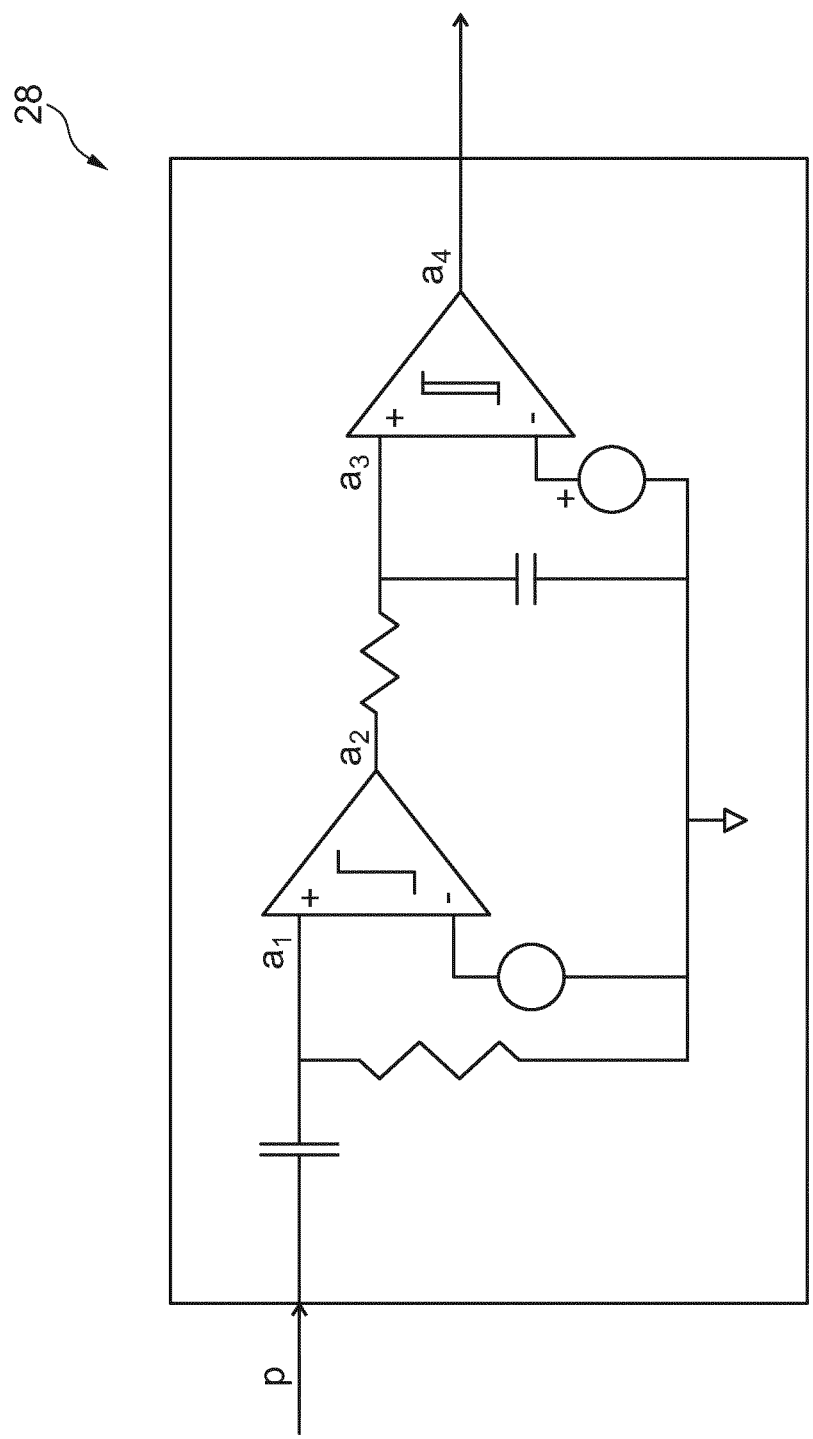
FIG. 8 schematically illustrates an exemplary embodiment of the rate detector.

A further example of the rate detector 28 is shown in FIG. 8.

According to a further example of the present invention, the signal correction unit 16 may be further configured to determine a first auxiliary signal $a_1$ by high-pass-filtering the process signal p. The signal correction unit 16 may be further configured to determine a second auxiliary signal $a_2$ by comparing the first auxiliary signal $a_1$ with a first auxiliary threshold value, wherein the value of the second auxiliary signal $a_2$ is a high second value, if the value of the first auxiliary signal $a_1$ exceeds the first auxiliary threshold value, and a low second value otherwise, wherein the high second value is larger than the low second value. The signal correction unit 16 may be further configured to determine a third auxiliary signal $a_3$ by low-pass-filtering the second auxiliary signal $a_2$. The signal correction unit 16 may be further configured to determine a fourth auxiliary signal $a_4$ by comparing the third auxiliary signal $a_3$ with a second auxiliary threshold value, wherein the value of the fourth auxiliary signal $a_4$ is a high fourth value, if the value of the third auxiliary signal $a_3$ exceeds the second auxiliary threshold value, and a low fourth value otherwise, wherein the high fourth value is larger than the low fourth value. The signal correction unit may be further configured to interrupt an update of the correction signal and/or the determination of a pulse signal as a forced pulse signal, while the value of the fourth auxiliary signal $a_4$ is equal to the high fourth value.

It is understood that, without repeating here all the explanations provided with reference to the signal correction unit 16, the rate detector 28 may be intended to be configured according to the previously explained configurations of the signal correction unit 16, in particular except for the configuration to interrupt the update of the correction signal and/or to interrupt the determination of a pulse signal as a forced pulse signal.

As a result, the process signal p may be fed to a high-pass-filter. The resulting signal, namely preferably the first auxiliary signal $a_1$, may be similar to the process signal p, if albeit with no DC component. The first auxiliary signal $a_1$ may be compared with a predefined threshold value, preferably the first auxiliary threshold value. The first auxiliary threshold value may be predefined or programmable. If the first auxiliary threshold value is reached by the first auxiliary signal $a_1$, the comparator shown in FIG. 8 may trips until the signal returns below the first threshold value. The second auxiliary signal $a_2$ may be provided to a low-pass-filter. The output value of the low-pass-filter may be proportional to an impinging rate of X-ray photons at the X-ray detector 42. The output signal of the low-pass-filter, in particular the auxiliary signal $a_3$, may therefore be compared with a predefined threshold, in particular with the second auxiliary threshold, which may be predefined or programmable. The result of this comparison may serve as an indication that a certain, preferably predefined rate has been reached. By changing the threshold values of both comparators, in particular of the first auxiliary threshold and/or of the second auxiliary threshold, one may not only be able to define a certain rate limit but also may be allowed to define how quickly the rate detector 28 must react to the flux reaching a predefined level. As a result, the rate detector 28 may therefore be flexible and adequate to control the sampling behavior of the signal correction circuit 16.

According to a further example of the present invention, the signal correction unit 16 and/or the rate detector 28 may be configured to observe the value of the process signal p and to interrupt an update of the correction signal, while the value of the process signal p is higher than a predefined processing value limit.

With respect to FIG. 2, it has been explained previously, that after the second sampling pulse $P_s$ has occurred, the observation of the process signal p has been interrupted during the first sampling period $T_{s1}$ subsequent to the second sampling pulse $P_s$. This was caused by the occurrence of the first process signal pulse $U_1$.

According to a further example of the present invention, the signal correction unit 16 may be configured to detect, if the first process signal pulse $U_1$ has been detected, an end time $T_e$ of the first process signal pulse $U_1$. The signal correction unit may be further configured to sample a second process value $V_2$ of the process signal p at the second sampling period $T_{s2}$ subsequent to the end time $T_e$ of the first process signal pulse $U_1$. The signal correction unit 16 may be further configured to observe the process signal p during the second sampling period $T_{s2}$ and a second validation period $T_{v2}$ subsequent to the second sampling period $T_{s2}$. The signal correction unit 16 may be further configured to detect a second process signal pulse $U_2$ at the process signal p, in case the second process signal pulse $U_2$ occurs during the second sampling period $T_{s2}$ and/or the second validation period $T_{v2}$. The signal correction unit 16 may be further configured to provide a correction signal c on the basis of the second process value $V_2$ subsequent to the second validation period $T_{v2}$, if the second process signal pulse $U_2$ has not been detected.

As a result, the sampling, the validation and the correction may be re-initiated at the end of a detected first process signal pulse $U_1$. If no further process signal pulse occurs during the subsequent periods, namely the second sampling period $T_{s2}$ and the second validation period $T_{v2}$, the signal correction unit 16 may be configured to determine, in particular (anew) set and/or update, the correction signal c. As a result, this re-initiation may correct the detector signal d delayed, however, within a time period between two following sampling pulses $P_s$.

According to a further example of the present invention, the signal correction unit 16 may be configured to interrupt, subsequently after the detection of the second process signal pulse $U_2$, the observation of the process signal p during the second sampling period $T_{s2}$ and/or the second validation period $T_{v2}$.

According to a further example of the present invention, the signal correction unit 16 may be configured to interrupt, subsequently after the detection of the second process signal pulse $U_2$, the detection of the second process signal pulse $U_2$.

As a result, the observation of the process signal during the second sampling period $T_{s2}$ and/or the second validation period $T_{v2}$ as well as the detection of the second process signal pulse $U_2$ may be interrupted, if during the re-initiated observation also occurs a process signal pulse, which may influence the validity of the sampled second process value $V_2$. In this case, the second process value $V_2$ may not serve as a valid basis for correcting the detector signal.

As exemplarily also shown in FIG. 2, the signal correction unit 16 may be configured for a forced sampling of the process signal p and a forced correction of the correction signal c.

According to a further example of the present invention, the signal correction unit 16 may be further configured to determine a provided signal pulse $p_s$ as a forced signal pulse $p_{sf}$, if a first process signal pulse $U_1$ has been detected during the previous first sampling period $T_{s1}$ and/or during the previous first validation period $T_{v1}$ and/or if a second process signal pulse $U_2$ has been detected during the previous second sampling period $T_{s2}$ and/or during the previous second validation period $T_{v2}$. Further, the signal correction unit 16 may be further configured to sample a third process value $V_3$ of the process signal p at a third sampling period $T_{s3}$ subsequent to the forced sampling pulse $p_{sf}$. Further, the signal correction unit 16 may be further configured to provide the correction signal c on the basis of the third process value $V_3$ subsequent to the third sampling period $T_{s3}$.

As a result, the provided sampling pulse $p_s$ may be set as the forced sampling pulse $p_{sf}$ if the performed observation of the process signal subsequent to previous sampling pulse has detected a process signal pulse and thus determining the related sampled first process value $V_1$ as invalid for updating the correction signal c. Further, for determining the sampling pulse $p_s$ as the forced sampling pulse $p_{sf}$ also the observation subsequent to the end time $T_e$ of the first sampling pulse may by be considered. Correspondingly, the provided sampling pulse $p_s$ may be set as the forced sampling pulse $p_{sf}$ if, in particular also, the performed observation of the process signal p subsequent to the end time $T_e$ has detected a process signal pulse and thus determined the related second process value $V_2$ as invalid for updating the correction signal c.

As a further result, an update or an anew set of the correction signal c may be forced, if the previous attempts, namely initiated by the previous sampling pulse $p_s$ or the previous end time $T_e$, failed.

As a further result, at least every second sampling pulse may initiate an update or an anew set of the correction signal c. This preferably ensures that a correction signal is provided, which prevents the process signal to obtain such a large value, which prevents the success of further adaptations of the correction signal initiated by following sampling pulses, which are periodically or randomly provided.

Figure 9:
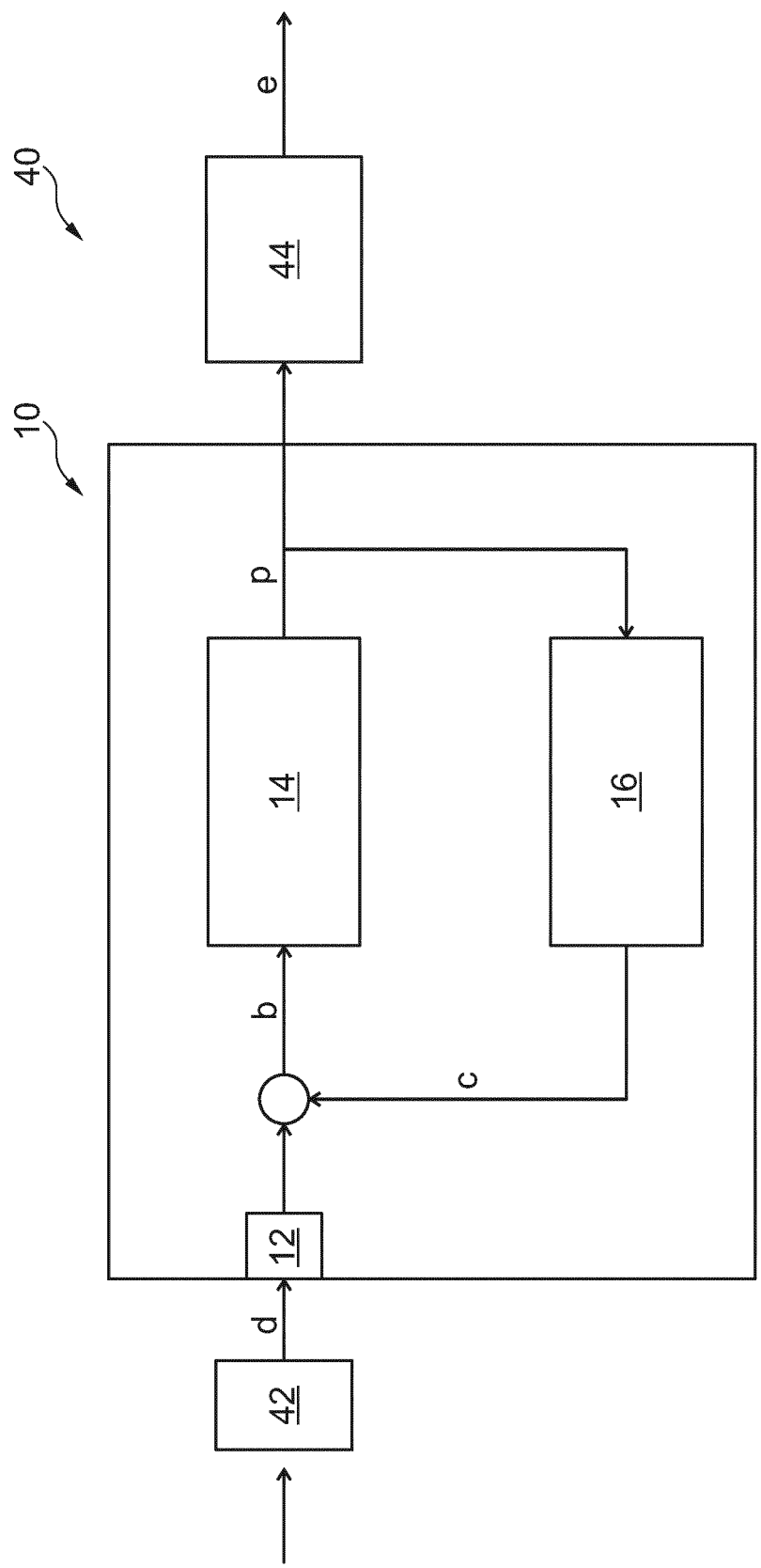
FIG. 9 schematically illustrates an exemplary embodiment of the system.

According to a further example of the invention, exemplarily shown in FIG. 9, an X-ray imaging system 40 is provided. The X-ray imaging system 40 may comprise an apparatus 10 according to one of the preceding explained examples. The X-ray imaging system 40 may further comprise a detector unit 42 configured to detect X-ray radiation. The X-ray radiation is indicated in FIG. 9 as an arrow to the left of X-ray detector unit 42. The X-ray imaging system 40 may further comprise an evaluation unit 44 configured to resolve the value of the process signal p into different value levels and to provide an evaluation signal e on the basis of the resolving results.

In an example, the X-ray imaging system 40 may further comprise an X-ray source and an object-receiving space. The object-receiving space may be arranged between the X-ray source and the detector unit 42. Accordingly, the detector signal d may indicate an image of an object, which may be arranged at the object-receiving space.

Figure 10:
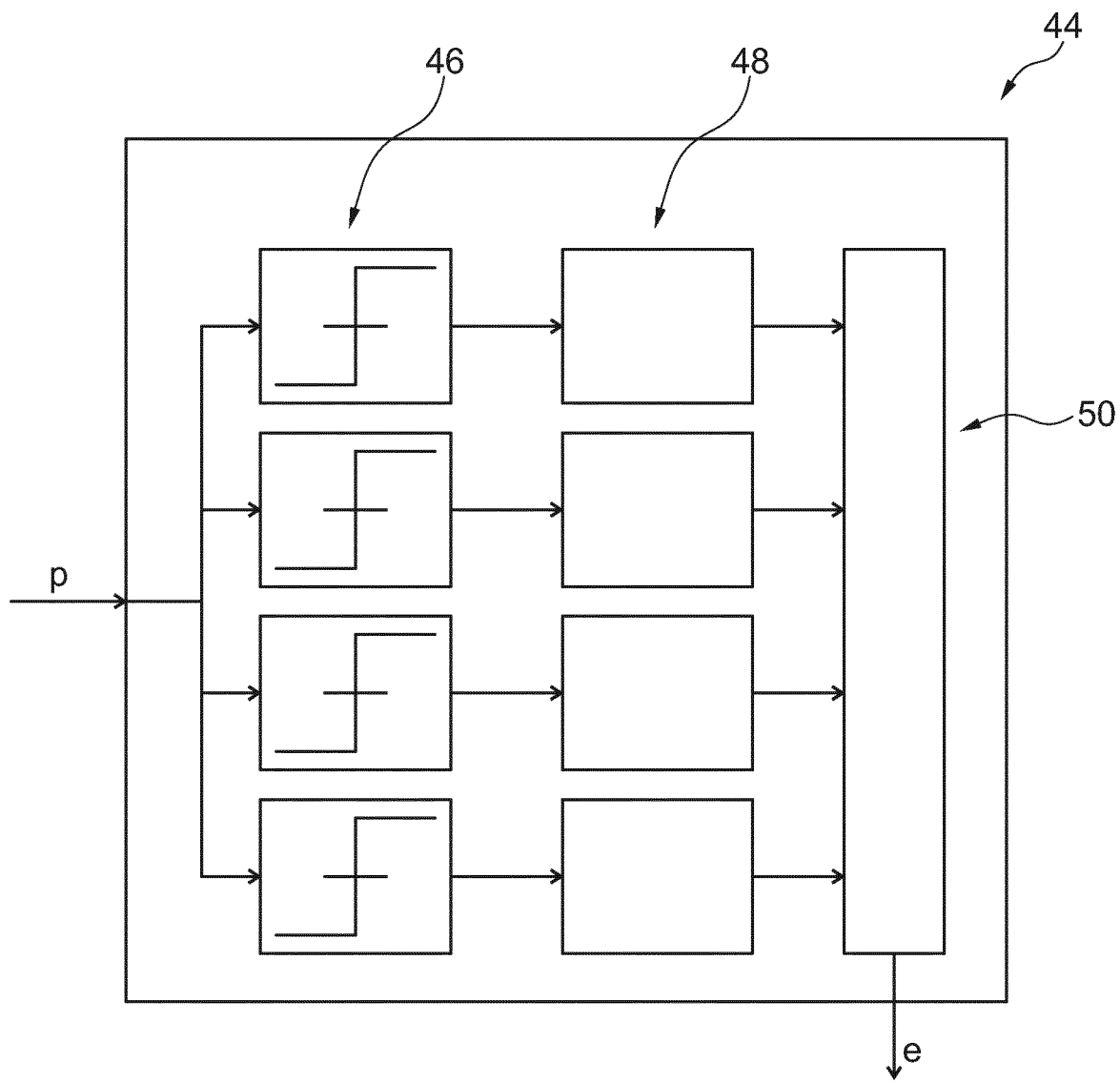
FIG. 10 schematically illustrates an exemplary embodiment of the evaluation unit.

An example of the evaluation unit 44 is shown in FIG. 10.

The evaluation unit 44 may be configured to determine the energy corresponding to the value of the pulses of the process signal p.

In an example, the evaluation unit 44 may comprise a plurality of discriminators 46, having each different threshold values for discriminating the process signal p. If the process signal p exceeds the respective threshold value of a discriminator 46, a corresponding counter 48 may be incremented. At an end of an evaluation time period, the number of counts at each counter 48 corresponds to the detected X-ray photons within a respective energy interval. The number at the counters 48 may be read out by a readout means 50. The readout means 50 may be configured to provide a respective evaluation signal e, representing the numbers of the counters 48.

Figure 11:
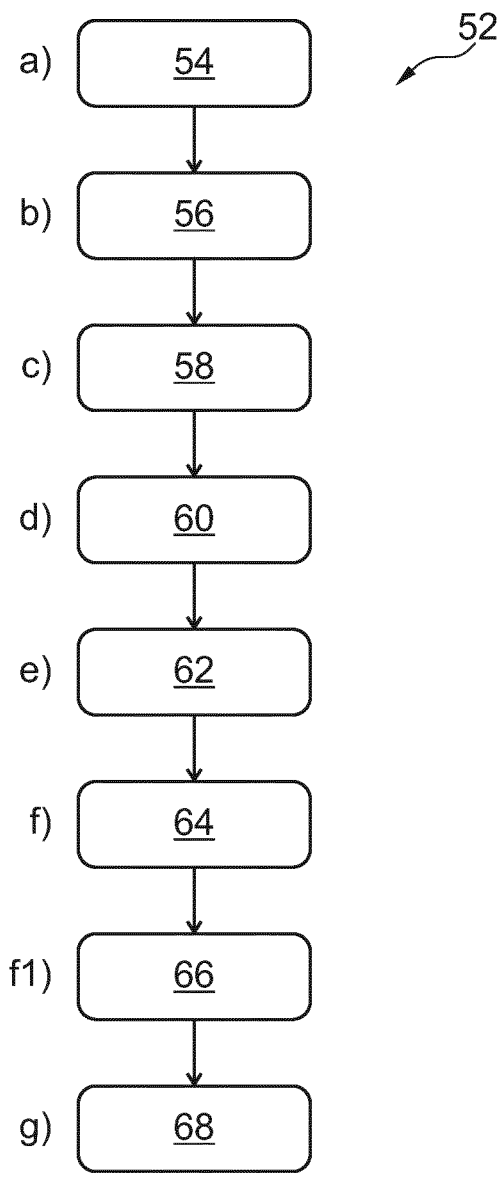
FIG. 11 schematically illustrates a chart of an exemplary embodiment of the method.

FIG. 11 schematically shows an example of the method 52 for processing a corrected X-ray detector signal. The method 52 may comprise the following: In a receiving step 54, also referred to as a step a), a detector signal d is received representing X-ray radiation detected by an X-ray detector 42.

In a second determining step 56, also referred to as step b), a basis signal b on the basis of a difference between the detector signal d and a correction signal c is determined.

In a third providing step 58, also referred to as step c), a process signal p is provided by signal processing the basis signal b.

In a fourth providing step 60, also referred to as step d), a sampling pulse $P_s$ is periodically or randomly provided.

In a fifth sampling step 62, also referred to as step e), a first process value $V_1$ of the process signal p is sampled at a first sampling period $T_{s1}$ subsequent to the sampling pulse $P_s$.

In a sixth observing step 64, also referred to as step f), the process signal p is observed during the first sampling period $T_{s1}$ and a first validation period $T_{v1}$ subsequent to the first sampling period $T_{s1}$.

In a seventh detecting step 66, which forms a sub-step of the sixth observing step 64 and is also referred to as step f1), a first process signal pulse $U_1$ is detected at the process signal p, in case the first process signal pulse $U_1$ occurs during the first sampling period $T_{s1}$ and/or the first validation period $T_{v1}$.

According to an eighth providing step 68, also referred to as step g), a correction signal c is provided on the basis of the first process value $V_1$ subsequent to the first validation period $T_{v1}$, if the first process signal pulse $U_1$ has not been detected.

As a result, the correction signal may be defined, in particular set and/or updated, if a first process signal value $V_1$ for correcting the detector signal d is sampled during the first sampling period $T_{s1}$ and evaluated as valid. Otherwise, the correction signal c may not be provided, thus may not be updated and/or anew set. Instead, the previous value of the correction signal may remain as the basis for the correction signal c.

It is understood, without repeating here all the examples, advantages and explanations provided with reference to the apparatus 10, the method 52 of the invention may be intended as being configured correspondingly. Thus, all the above provided examples and explanations, although provided with reference to the apparatus 10 or system 40, may be intended as being implemented by the method 52.

With respect to the order of the method steps, it is to be noted that step d) is performed before step e), step e) is performed before step f) and step f) is performed before step g). Further, steps a), b) and c) may be performed continuously and/or in parallel. In particular, the X-ray detector 42 may provide a continuous detector signal d, which may be continuously received. The process signal p may also be provided continuously. Further, the determination of the basis signal b may be determined continuously on the basis of a difference between the detector signal d and a correction signal c.

Figure 12:
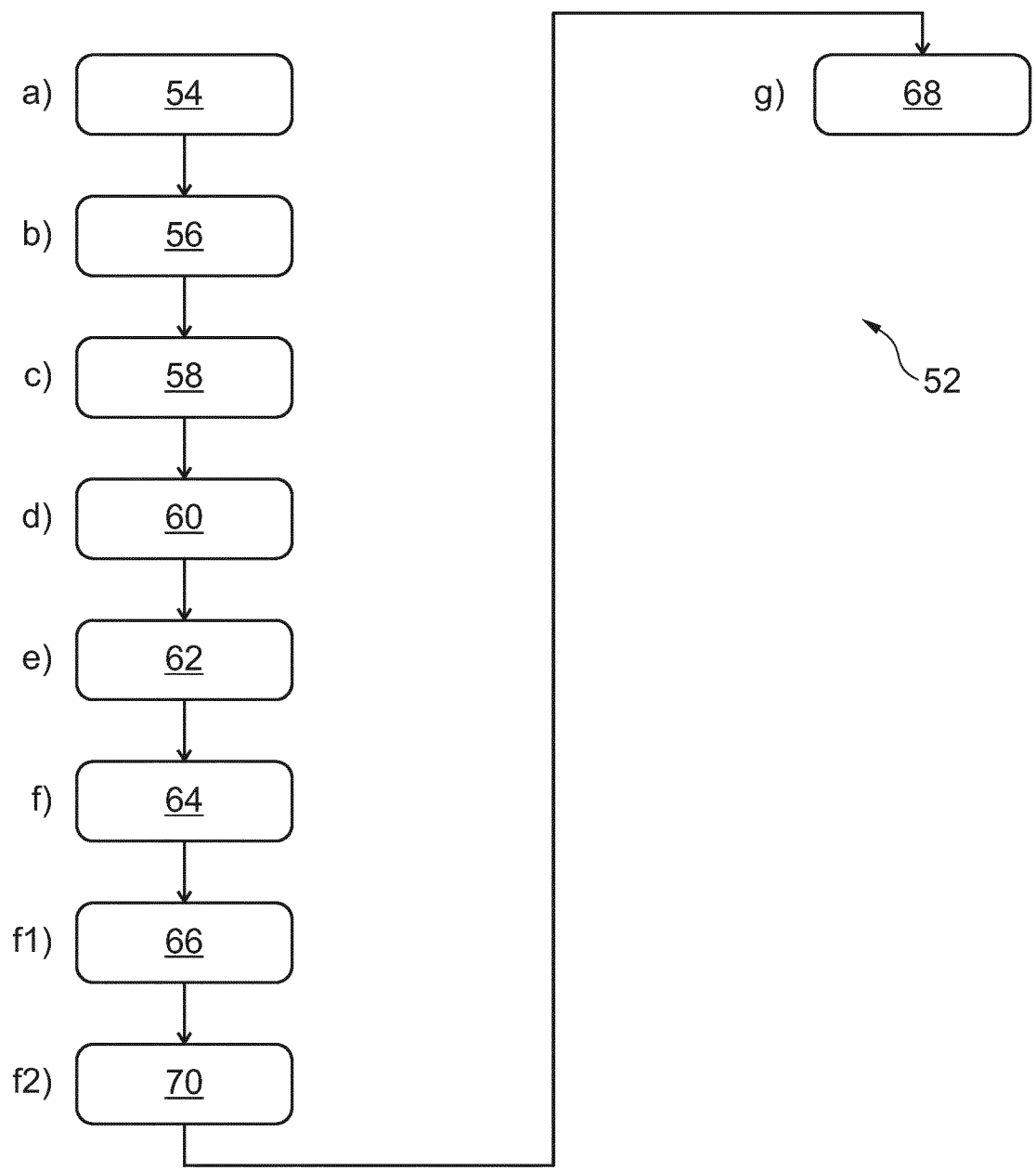
FIG. 12 schematically illustrates a chart of a further exemplary embodiment of the method.

As schematically shown in FIG. 12, the method 52 may also comprise an interrupting step 70, also referred to as step f2).

The step f2) may be a sub-step of step f). The step f2) may relate to an interrupting of step f), if and subsequently after the first process signal pulse $U_1$ has been detected.

As a result, the observing of the process signal p may be interrupted, if the first process signal pulse $U_1$ occurs during the first sampling period $T_{s1}$ or the first validation period $T_{v1}$. Thus, an incorrect update of the correction signal c may be prevented.

Figure 13:
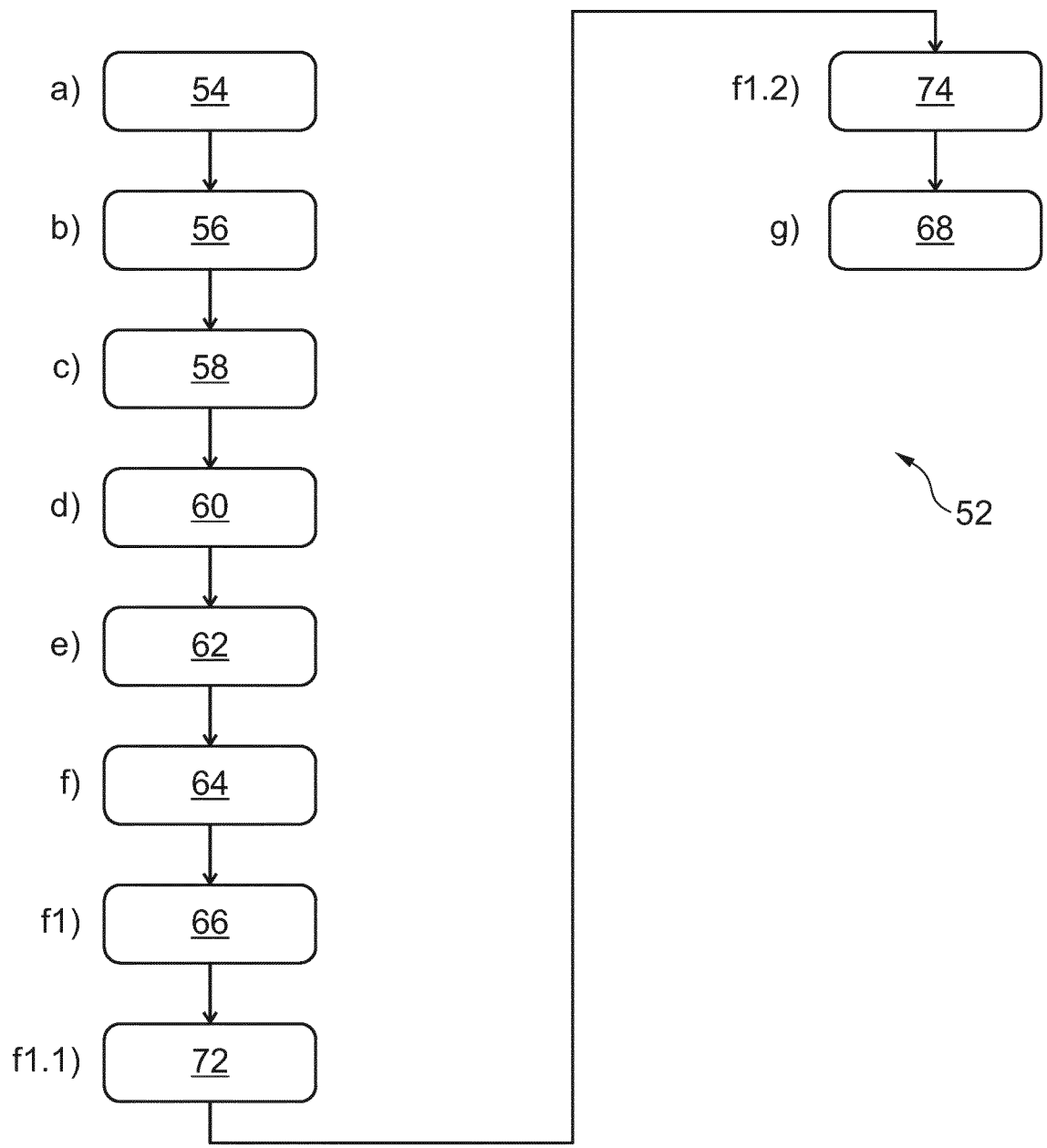
FIG. 13 schematically illustrates a chart of a further exemplary embodiment of the method.

As schematically shown in FIG. 13, the method 52 may also comprise a comparing step 72, also referred to as step f1.1), and a determining step 74, also referred to as step f1.2).

The steps f1.1) and f1.2) may be sub-steps of step f1).

The step f1.1) may relate to a comparison of the value of the process signal p with an upper threshold value $P_{th,max}$ and/or a lower threshold value $P_{th,min}$, wherein the upper threshold value $P_{th,max}$ is larger than a baseline value $P_{base}$ and the lower threshold value $P_{th,min}$ is smaller than the baseline value $P_{base}$.

The step f1.2) may relate to a determination of an occurrence of the first process signal pulse $U_1$, if the value of the process signal p exceeds the upper threshold value $P_{th,max}$ or the lower threshold value $P_{th,min}$.

Figure 14:
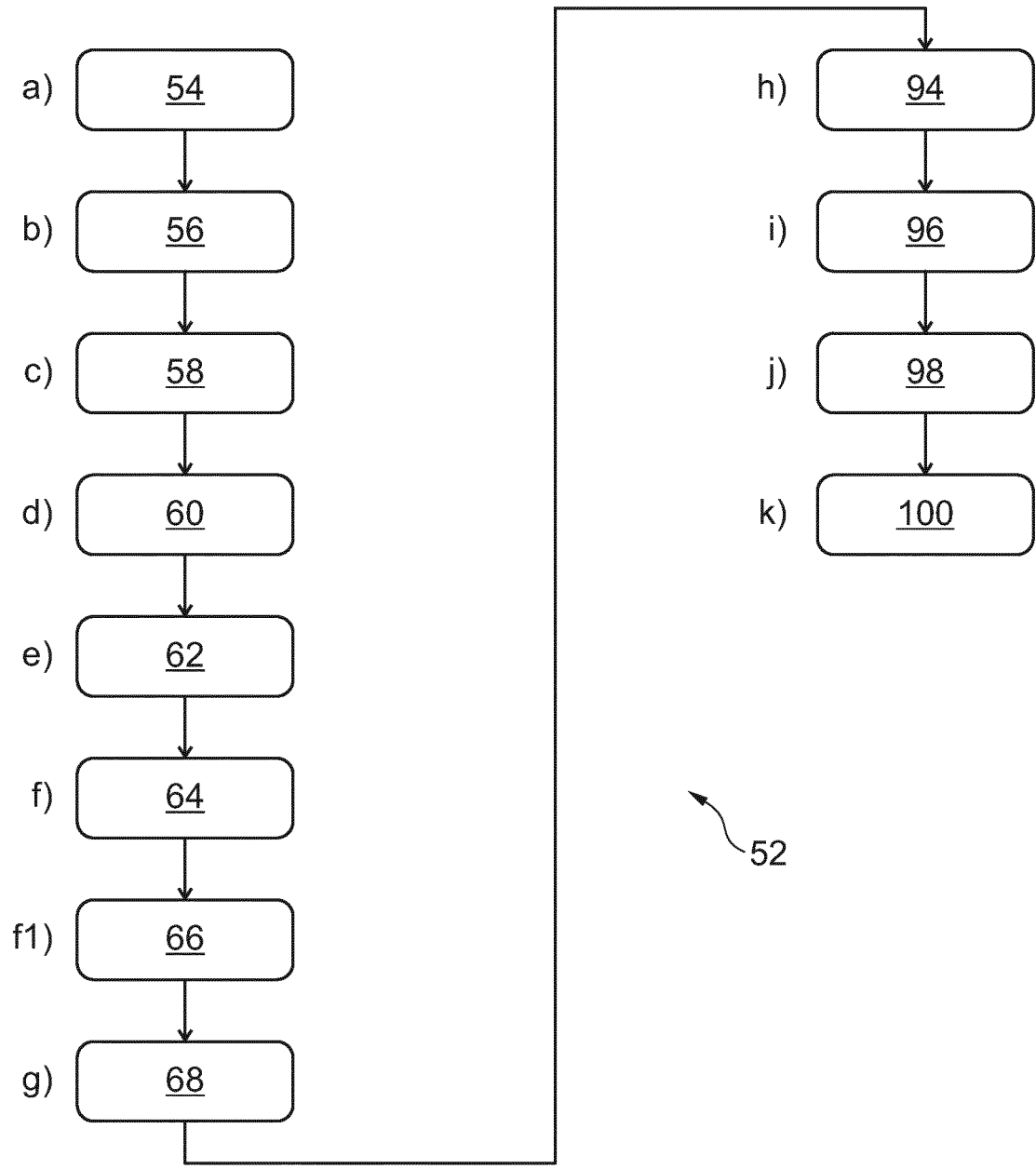
FIG. 14 schematically illustrates a chart of a further exemplary embodiment of the method.

As schematically shown in FIG. 14, the method 52 may comprise a detecting step 94, also referred to as step h), a sampling step 96, also referred to as step i), an observing step 98, also referred to as step j), and a providing step 100, also referred to as step k).

The step h) may relate to a detecting of an end time $T_e$ of the first process signal pulse $U_1$, if the first process signal pulse $U_1$ has been detected.

The step i) may relate to a sampling of a second process value $V_2$ of the process signal p at a second sampling period $T_{s2}$ subsequent to the end time $T_e$ of the first process signal pulse $U_1$.

The step j) may relate to an observing of the process signal p during the second sampling period $T_{s2}$ and a second validation period $T_{v2}$ subsequent to the second sampling period $T_{s2}$. The step j) may comprises the sub-step of detecting of a second process signal pulse $U_2$ at the process signal, in case the second process signal pulse $U_2$ occurs during the second sampling period $T_{s2}$ and/or the second validation period $T_{v2}$.

The step k) may relate to a providing of the correction signal c on the basis of the second process value $V_2$ subsequent to the second validation period $T_{v2}$, if the second process signal pulse $U_2$ has not been detected.

According to an example of the present invention, the step j) may comprise the sub-step of interrupting step j), subsequently after the second process signal pulse $U_2$ has been detected.

Figure 15:
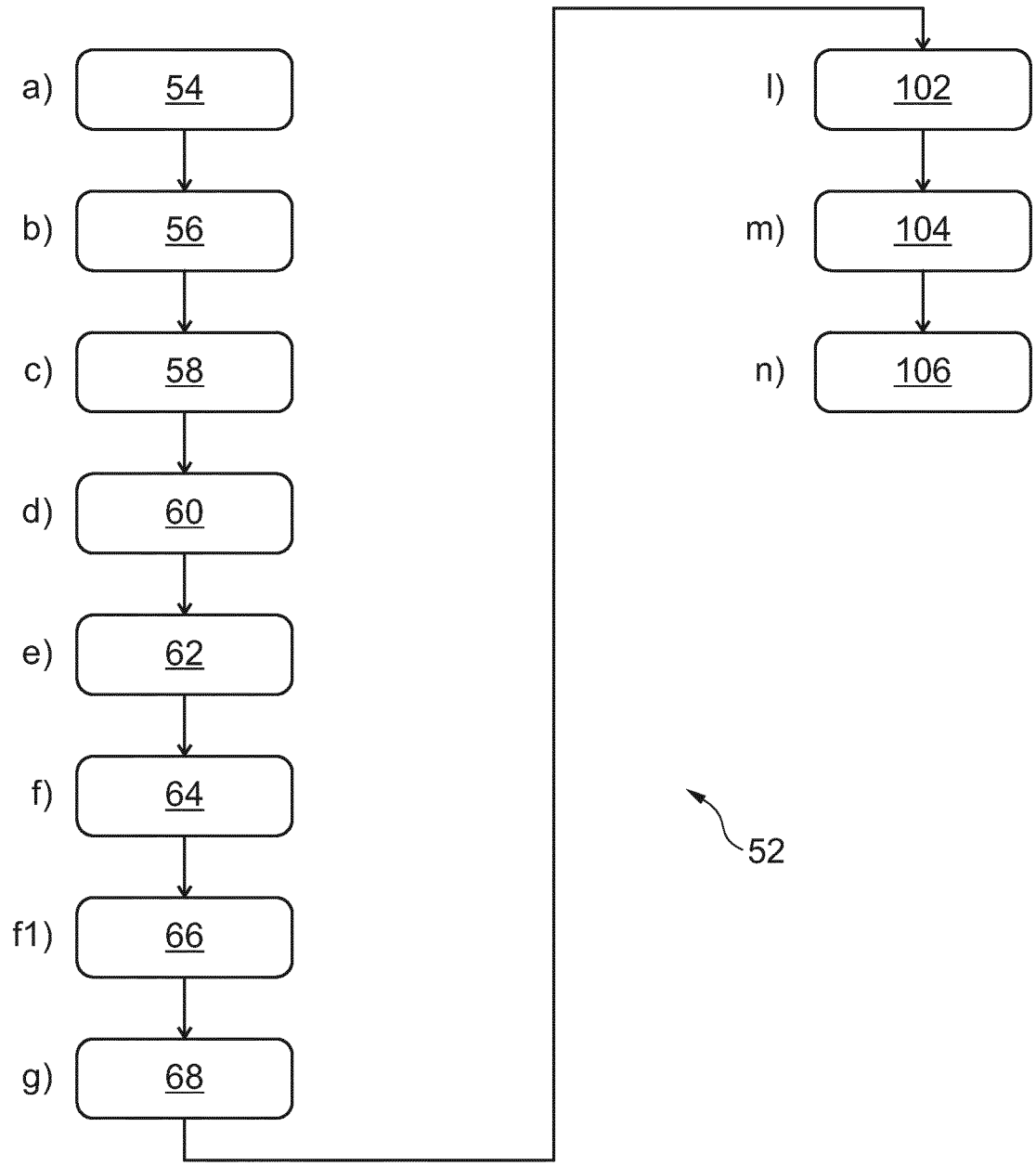
FIG. 15 schematically illustrates a chart of a further exemplary embodiment of the method.

As schematically shown in FIG. 15, the method 52 may comprise a determining step 102, also referred to as step l), a sampling step 104, also referred to as step m), and a providing step 106, also referred to as step n).

The determining step l) may relate to a determining of a provided signal pulse $p_s$ as a forced signal pulse $p_{sf}$, if a first process signal pulse $V_1$ has been detected during the previous first sampling period $T_{s1}$ and/or during the previous first validation period $T_{v1}$ and/or if a second process signal pulse $U_2$ has been detected during the previous second sampling period $T_{s2}$ and/or during the previous second validation period $T_{v2}$.

The sampling step m) may relate to a sampling of a third process value $V_3$ of the process signal p at a third sampling period $T_{s3}$ subsequent to the forced sampling pulse $p_{sf}$.

The providing step n) may relate to a providing of the correction signal c on the basis of the third process value $V_3$ subsequent to the third sampling period $T_{s3}$.

Figure 16:
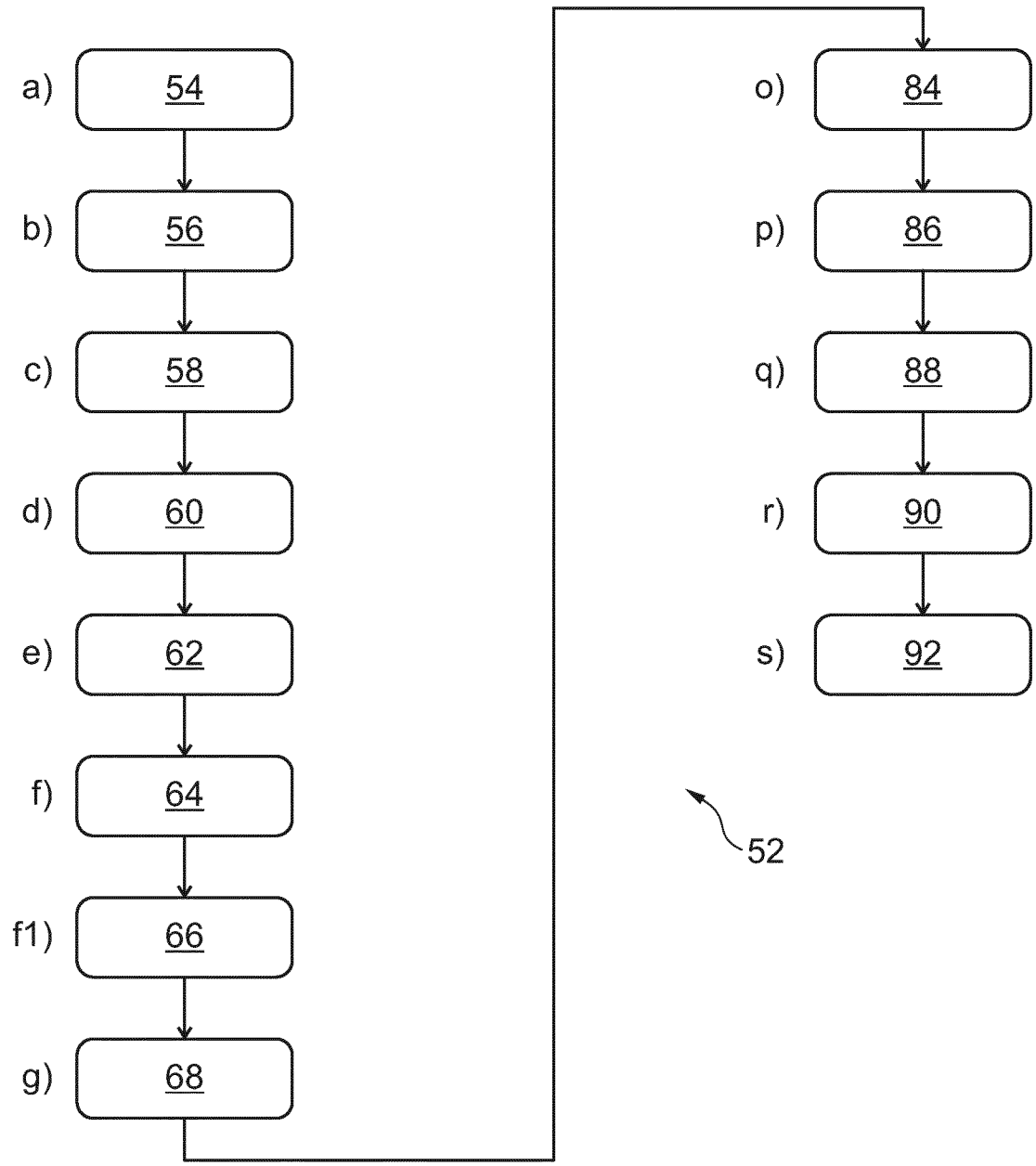
FIG. 16 schematically illustrates a chart of a further exemplary embodiment of the method.

As schematically shown in FIG. 16, the method 52 may comprise a determining step 84, also referred to as o), a determining step 86, also referred to as p), a determining step 88, also referred to as q), a determining step 90, also referred to as r), and an interrupting step 92, also referred to as s).

The step o) may relate to a determining of a first auxiliary signal a1 by high-pass-filtering the process signal p.

The step p) may relate to a determining of a second auxiliary signal a2 by comparing the first auxiliary signal a1 with a first auxiliary threshold value, wherein the value of second auxiliary a2 is set to a high second value, if the first auxiliary value a1 exceeds the first auxiliary threshold value, and to a low second value otherwise, wherein the high second value is larger than the low second value.

The step q) may relate to a determining of a third auxiliary signal a3 by low-pass-filtering the second auxiliary signal a2.

The step r) may relate to a determining of a fourth auxiliary signal a4 by comparing the third auxiliary signal a3 with a second auxiliary threshold value, wherein the value of fourth auxiliary a4 is set to a high fourth value, if the third auxiliary value a3 exceeds the second auxiliary threshold value, and to a low fourth value otherwise, wherein the high fourth value is larger than the low fourth value.

Figure 17:
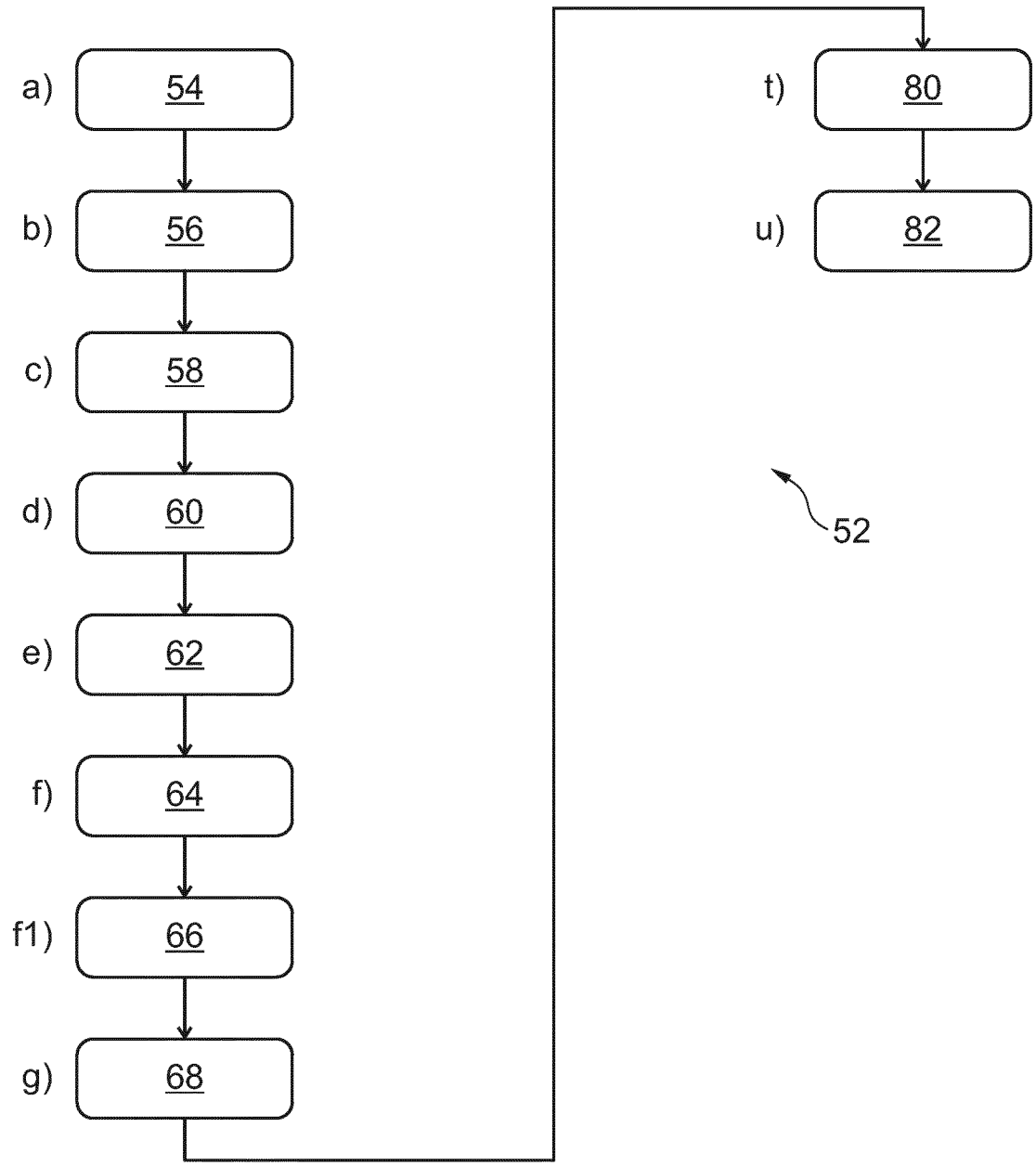
FIG. 17 schematically illustrates a chart of a further exemplary embodiment of the method.

The step s) may relate to an interrupting of step g) or step l), while the value of the fourth signal a4 is equal to the high fourth value. As schematically shown in FIG. 17 the method 52 may comprise an observing step 80, also referred to as t), and an interrupting step 82, also referred to as step u).

The step t) may relate to an observing of the value of the process signal p.

The step u) may relate to an interrupting of step g) or step l), while the value of the process signal p is higher than a predefined process value limit.

Figure 18:
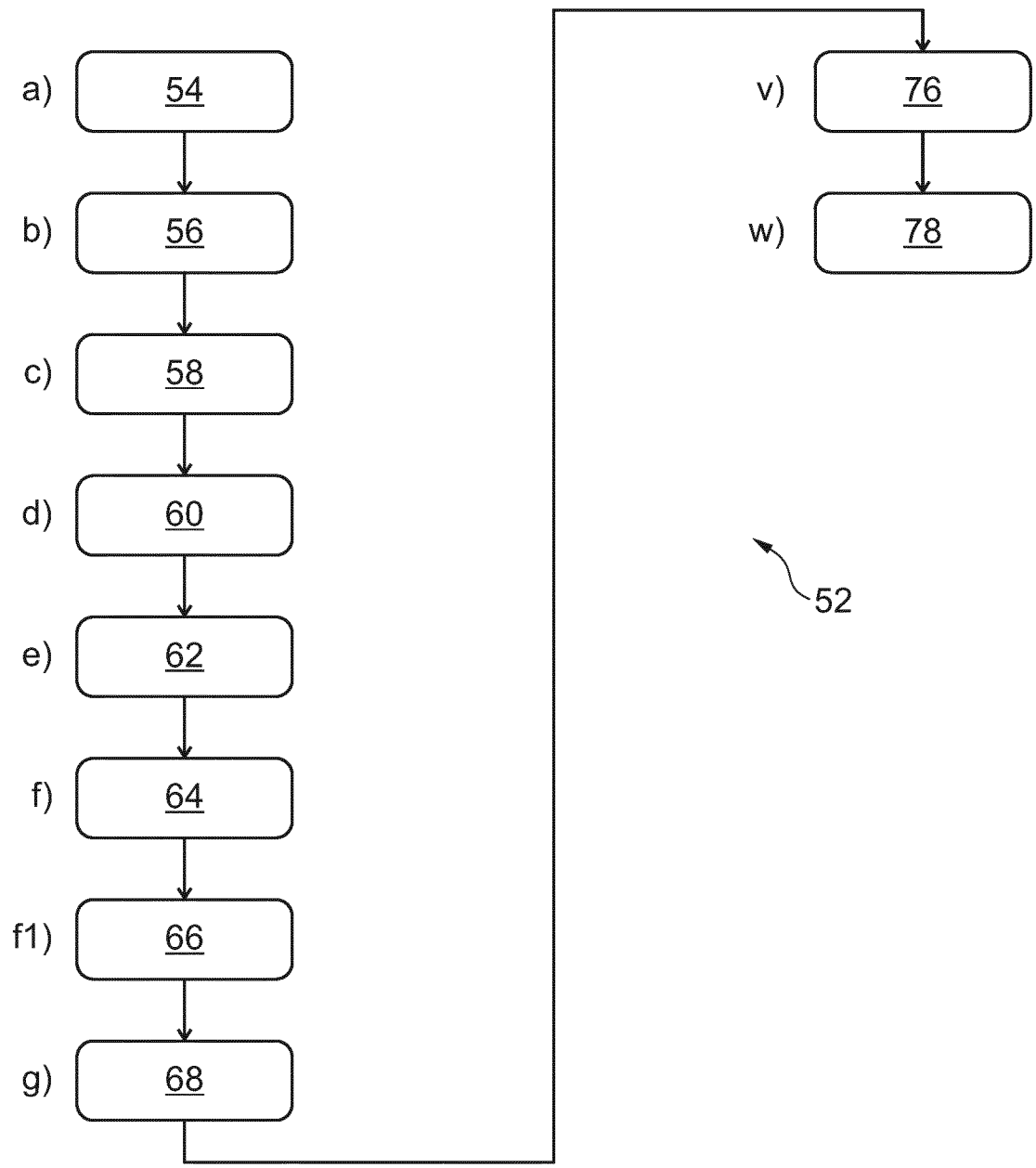
FIG. 18 schematically illustrates a chart of a further exemplary embodiment of the method.

As schematically shown in FIG. 18, the method 52 may comprise an observing step 76, also referred to as step v), and an interrupting step 78, also referred to as step w).

The step v) may relate to observing a pulse rate of the process signal p and/or the detector signal d.

The step w) may relate to an interrupting of step g) or l), while the pulse rate is higher than a predefined mean rate limit.

According to a further example of the present invention, a computer program element is provided, which, when being executed by a processing unit is adapted to carry out the method described above.

According to further example of the present invention, a computer readable medium having stored thereon a program element is provided, which, when being executed by a processing unit is adapted to carry out the method described above.

The computer program element might be stored on a computer unit, which might also be part of an embodiment of the present invention. This computing unit may be adapted to perform or induce a performing of the steps of the method described above. Moreover, it may be adapted to operate the components of the above described apparatus. The computing unit can be adapted to operate automatically and/or to execute the orders of a user. A computer program may be loaded into a working memory of a data processor. The data processor may thus be equipped to carry out the method of the invention.

It has to be noted that embodiments of the invention are described with reference to different subject matters. In particular, some embodiments are described with reference to an insert whereas other embodiments are described with reference to the apparatus. However, a person skilled in the art will gather from the above that, unless otherwise notified, in addition to any combination of features belonging to one subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive. The invention is not limited to the disclosed embodiments. Other variations to the disclosed embodiments can be understood and effected by those skilled in the art in practicing a claimed invention, from a study of the drawings, the disclosure, and the dependent claims.

In the claims, the word "comprising" does not exclude other elements or steps, and the indefinite article "a" or "an" does not exclude a plurality. A single detector unit or other units may fulfil the functions of several items re-cited in the claims. The mere fact that certain measures are re-cited in mutually different dependent claims does not indicate that a combination of these measures cannot be used to advantage. Any reference signs in the claims should not be construed as limiting the scope.

The invention claimed is:

1. An apparatus for correcting an X-ray detector signal, comprising:
    an input interface configured to receive a detector signal representing X-ray radiation, wherein the detector signal comprises one or more pulses that relate to detected X-ray quanta and/or X-ray photons; and
    one or more processors configured to:
        determine a corrected detector signal based on the detector signal and a correction signal, wherein the corrected detector signal provides a baseline for the detector signal when no pulse is detected;
        process the corrected detector signal to output a process signal;
        periodically or randomly generate a sampling pulse;
        sample the process signal at a first sampling period after the sampling pulse;
        observe the process signal during the first sampling period and a first validation period after the first sampling period;
        detect a first process signal pulse if the first process signal pulse occurs during at least one of the first sampling period and the first validation period; and
        generate the correction signal on the basis of the process signal after the first validation period, if the first process signal pulse is not detected.

2. The apparatus according to claim 1, wherein the one or more processors is further configured to compare the process signal between an upper threshold value and a lower threshold value, wherein the upper threshold value is larger than a predetermined baseline value and the lower threshold value is smaller than the predetermined baseline value, and to determine an occurrence of the first process signal pulse if the process signal exceeds the upper threshold value or the lower threshold value.

3. The apparatus according to claim 1, wherein the one or more processors is further configured:
    to detect an end time of the first process signal pulse if the first process signal pulse is detected;
    to sample the process signal at a second sampling period after the end time of the first process signal pulse;
    to observe the process signal during the second sampling period and a second validation period after the second sampling period;
    to detect a second process signal pulse if the second process signal pulse occurs during at least one of the second sampling period and the second validation period; and
    to provide the correction signal if the second process signal pulse is not detected.

4. The apparatus according to claim 3, wherein the one or more processors is further configured:
    to determine the sampling pulse as a forced sampling pulse;

if the first process signal pulse is detected during the first sampling period and the first validation period, and if the second process signal pulse is detected during the second sampling period and the second validation period;

to sample the process signal at a third sampling period after the forced sampling pulse; and to provide the correction signal based on the sampled process signal during the third sampling period.

5. An X-ray imaging system, comprising:

an apparatus comprising:

an input interface configured to receive a detector signal representing X-ray radiation, wherein the detector signal comprises one or more pulses that relate to detected X-ray quanta and/or X-ray photons;

one or more processors configured to:

determine a corrected detector signal based on the detector signal and a correction signal, wherein the corrected detector signal provides a baseline for the detector signal when no pulse is detected;

process the corrected detector signal to output a process signal;

periodically or randomly provide a sampling pulse;

sample the process signal at a first sampling period after the sampling pulse;

observe the process signal during the first sampling period and a first validation period after the first sampling period;

detect a first process signal pulse if the first process signal pulse occurs during at least one of the first sampling period and the first validation period; and provide the correction signal on the basis of the process signal after the first validation period, if the first process signal pulse is not detected; and an X-ray detector configured to detect the X-ray radiation;

wherein the one or more processors is configured to resolve the process signal into different value levels and provide an evaluation signal.

6. A method for correcting an X-ray detector signal, comprising:

receiving a detector signal representing X-ray radiation, wherein the detector signal comprises one or more pulses that relate to detected X-ray quanta and/or X-ray photons;

determining a corrected detector signal based on the detector signal and a correction signal, wherein the corrected detector signal provides a baseline for the detector signal when no pulse is detected;

processing the corrected detector signal to output a process signal;

periodically or randomly generating a sampling pulse;

sampling the process signal at a first sampling period after the sampling pulse;

observing the process signal during the first sampling period and a first validation period after the first sampling period;

detecting a first process signal pulse if the first process signal pulse occurs during at least one of the first sampling period and the first validation period; and generating the correction signal on the basis of the process signal after the first validation period, if the first process signal pulse is not detected.

7. The method according to claim 6, further comprising interrupting observing the process signal if the first process signal pulse is detected.

8. The method according to claim 6, further comprising:

comparing the process signal between an upper threshold value and a lower threshold value, wherein the upper threshold value is larger than a predetermined baseline value and the lower threshold value is smaller than the predetermined baseline value; and determining an occurrence of the first process signal pulse if the process signal exceeds the upper threshold value or the lower threshold value.

9. The method according to claim 6, further comprising:

detecting an end time of the first process signal pulse if the first process signal pulse is detected;

sampling the process signal at a second sampling period after the end time of the first process signal pulse;

observing the process signal during the second sampling period and a second validation period after the second sampling period;

detecting a second process signal pulse if the second process signal pulse occurs during at least one of the second sampling period and the second validation period; and providing the correction signal if the second process signal pulse is not detected.

10. The method according to claim 9, further comprising:

determining the sampling pulse as a forced sampling pulse if a first process signal pulse is detected during the first sampling period and during the first validation period, and if the second process signal pulse is detected during the second sampling period and the second validation period;

sampling the process signal at a third sampling period after the forced sampling pulse; and providing the correction signal based on the sampled process signal during the third sampling period.

\* \* \* \* \*